US009600217B2

(12) United States Patent
Nitta et al.

(10) Patent No.: US 9,600,217 B2
(45) Date of Patent: Mar. 21, 2017

(54) PORTABLE APPARATUS DISPLAYING APPARATUS INFORMATION ON ELECTRONIC APPARATUS

(71) Applicant: Kyocera Document Solutions Inc., Osaka (JP)

(72) Inventors: Tsuyoshi Nitta, Osaka (JP); Yoshitaka Matsuki, Osaka (JP); Wataru Endo, Osaka (JP); Satoshi Kawakami, Osaka (JP); Masato Tanba, Osaka (JP); Yuri Moritani, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 389 days.

(21) Appl. No.: 14/195,955

(22) Filed: Mar. 4, 2014

(65) Prior Publication Data

US 2014/0253744 A1    Sep. 11, 2014

(30) Foreign Application Priority Data

Mar. 5, 2013   (JP) .................................. 2013-043182
Mar. 5, 2013   (JP) .................................. 2013-043184

(51) Int. Cl.
  *H04N 1/028*    (2006.01)
  *G06F 3/12*     (2006.01)
  (Continued)

(52) U.S. Cl.
  CPC .......... *G06F 3/1261* (2013.01); *G06F 3/1207* (2013.01); *G06F 3/1229* (2013.01);
  (Continued)

(58) Field of Classification Search
  CPC .................................................. H04N 1/00233
  (Continued)

(56) References Cited

U.S. PATENT DOCUMENTS 5,881,212 A * 3/1999 Morita .................. G06F 3/1297
                                                            358/1.12
2012/0019858 A1   1/2012 Sato
(Continued)

FOREIGN PATENT DOCUMENTS

| JP | 2012090077 | 5/2012 |
| JP | 2012108053 | 6/2012 |
| JP | 2012129996 | 7/2012 |

*Primary Examiner* — Brian Yenke
*Assistant Examiner* — Justin Sanders
(74) *Attorney, Agent, or Firm* — K&L Gates LLP

(57) ABSTRACT

A portable apparatus includes an image capturing device, a display device, an indoor image acquisition unit, an apparatus position acquisition unit, an apparatus information acquisition unit, and a display control unit. The indoor image acquisition unit acquires an indoor image of a building having a plurality of floors. The apparatus position acquisition unit acquires a position of an electronic apparatus in real space. The apparatus information acquisition unit acquires apparatus information on the electronic apparatus. The display control unit causes the display device to display a composite image formed by combining additional information based on the apparatus information with a to-be-combined image, while linking the additional information to a position of the electronic apparatus in the to-be-combined image, this position corresponding to a relationship between the position of the electronic apparatus in real space and a position of the portable apparatus in real space.

7 Claims, 24 Drawing Sheets

(51) Int. Cl.
*G06T 11/00* (2006.01)
*H04N 1/00* (2006.01)
*H04N 1/32* (2006.01)

(52) U.S. Cl.
CPC .......... *G06F 3/1259* (2013.01); *G06F 3/1292* (2013.01); *G06T 11/00* (2013.01); *H04N 1/00408* (2013.01); *H04N 1/00222* (2013.01); *H04N 1/00344* (2013.01); *H04N 1/32144* (2013.01); *H04N 2201/0084* (2013.01); *H04N 2201/0094* (2013.01); *H04N 2201/3204* (2013.01); *H04N 2201/3205* (2013.01); *H04N 2201/3219* (2013.01); *H04N 2201/3221* (2013.01); *H04N 2201/3245* (2013.01); *H04N 2201/3273* (2013.01)

(58) Field of Classification Search
USPC .......................................................... 348/143
See application file for complete search history.

(56) References Cited

U.S. PATENT DOCUMENTS

2012/0147041 A1 6/2012 Jang
2012/0182432 A1* 7/2012 Okamoto .............. G06F 3/1204
348/207.1

* cited by examiner

PORTABLE APPARATUS DISPLAYING APPARATUS INFORMATION ON ELECTRONIC APPARATUS

REFERENCE TO RELATED APPLICATIONS

This application is based upon and claims the benefit of priority from the corresponding Japanese Patent Application No. 2013-043182, filed in the Japan Patent Office on Mar. 5, 2013, and the corresponding Japanese Patent Application No. 2013-043184, filed in the Japan Patent Office on Mar. 5, 2013, the entire contents of which are incorporated herein by reference.

FIELD

The present disclosure relates to a portable apparatus that displays, on a display device, a composite image formed of an image captured by an image capturing device and additional information based on apparatus information on a target electronic apparatus.

BACKGROUND

A typical portable apparatus causes a display device to display a composite image formed by combining additional information based on apparatus information on an electronic apparatus and an image of the electronic apparatus with a captured image, at a position of the electronic apparatus in the captured image, this position corresponding to a relationship between the position of the electronic apparatus in real space and the position of the portable apparatus in real space.

A typical portable apparatus is unable to make the user aware of an electronic apparatus that is installed on a floor that is different from the floor where the portable apparatus is currently present in the situation where electronic apparatuses are installed in a building having a plurality of floors.

A typical portable apparatus has to give, in the situation where the typical portable apparatus causes a first image forming apparatus to stop a job and causes a second image forming apparatus to take over the job, an instruction for the first image forming apparatus to stop the job and an instruction for the second image forming apparatus to take over the job.

SUMMARY

A portable apparatus according to an embodiment of the present disclosure includes an image capturing device, a display device, an indoor image acquisition unit, an apparatus position acquisition unit, an apparatus information acquisition unit, and a display control unit. The indoor image acquisition unit is configured to acquire an indoor image of a building having a plurality of floors. The apparatus position acquisition unit is configured to acquire the position of an electronic apparatus in real space. The apparatus information acquisition unit is configured to acquire apparatus information on the electronic apparatus. The display control unit is configured to cause the display device to display a composite image formed by combining additional information based on the apparatus information that has been acquired by the apparatus information acquisition unit with a to-be-combined image, while linking the additional information to the position of the electronic apparatus in the to-be-combined image, this position corresponding to the relationship between the position of the electronic apparatus in real space which has been acquired by the apparatus position acquisition unit and the position of the portable apparatus in real space. Furthermore, the display control unit is configured, in the situation where an image capturing angle of the image capturing device relative to the horizontal plane in real space is equal to or less than a certain angle, to use a captured image captured by the image capturing device, as the to-be-combined image. The display control unit is configured, in the situation where the image capturing angle of the image capturing device relative to the horizontal plane in real space vertically exceeds the certain angle, to use an indoor image of a location on a floor located relative to a floor where the portable apparatus is present in a direction of the image capturing angle, the location corresponding to the position of the portable apparatus in the horizontal direction in real space and the direction in which the image capturing device is oriented, the indoor image having been acquired by the indoor image acquisition unit, as the to-be-combined image.

A portable apparatus according to an embodiment of the present disclosure includes an image capturing device, a display device, an apparatus position acquisition unit, an apparatus information acquisition unit, a display control unit, an instruction receiving unit, and an order transmission unit. The apparatus position acquisition unit is configured to acquire the position of an electronic apparatus in real space. The apparatus information acquisition unit is configured to acquire apparatus information on the electronic apparatus. The display control unit is configured to cause the display device to display a composite image formed by combining additional information based on the apparatus information that has been acquired by the apparatus information acquisition unit with a captured image captured by the image capturing device, while linking the additional information to the apparatus position, which is the position of the electronic apparatus in the captured image, this position corresponding to the relationship between the position of the electronic apparatus in real space which has been acquired by the apparatus position acquisition unit and a position of the portable apparatus in real space. The instruction receiving unit is configured to receive an instruction on the additional information in the composite image. The order transmission unit is configured to transmit an order, for the electronic apparatus, based on the instruction that has been received by the instruction receiving unit. Furthermore, the order transmission unit is configured, in the situation where, after transmitting an order for a first electronic apparatus to perform a job, an instruction for taking over the job by a second electronic apparatus has been received by the instruction receiving unit, to transmit an order for the first electronic apparatus to stop the job. The order transmission unit is configured, in the situation where, after transmitting the order for the first electronic apparatus to stop the job, processing completion information, the processing completion information indicating a portion of the job for which processing has been completed, has been acquired by the apparatus information acquisition unit as the apparatus information on the first electronic apparatus, to transmit an order for the second electronic apparatus to perform a portion of the job for which processing has not been completed, based on the processing completion information.

Additional features and advantages are described herein, and will be apparent from the following detailed description and the figures.

BRIEF DESCRIPTION OF THE FIGURES

All drawings are intended to illustrate some aspects and examples of the present disclosure. The drawings described are only schematic and are non-limiting, and are not necessarily drawn to scale.

DETAILED DESCRIPTION

Various embodiments are described below with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

An embodiment of the present disclosure will be described below with reference to the drawings.

First, a configuration of an image forming system 10 that serves as an apparatus information display system according to an embodiment will be described.

Figure 1:
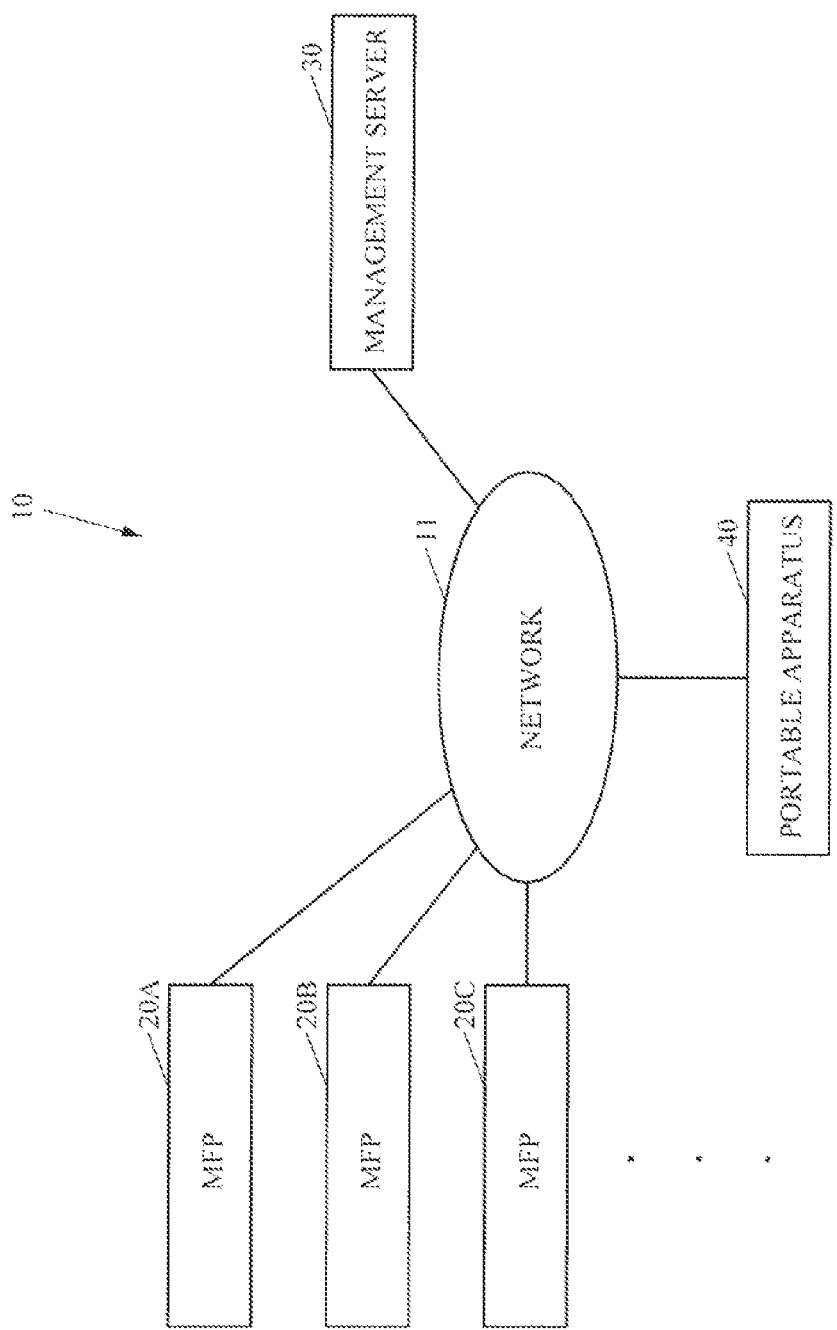
FIG. 1 illustrates a configuration of an image forming system according to an embodiment of the present disclosure.

FIG. 1 illustrates a configuration of the image forming system 10 according to an embodiment.

As illustrated in FIG. 1, the image forming system 10 includes a plurality of multifunction peripherals (MFPs) including MFPs 20A, 20B, and 20C that serve as electronic apparatuses, a management server 30 that manages the plurality of MFPs, and a portable apparatus 40, such as a smartphone, for example, which makes a composite image formed of a captured image and additional information based on apparatus information on a target MFP displayed. The plurality of MFPs including the MFPs 20A, 20B, and 20C, the management server 30, and the portable apparatus 40 are connected to one another over a network 11, such as a local area network (LAN) or the Internet, so as to enable communication with one another.

The configuration of each of the plurality of MFPs included in the image forming system 10 is similar to the configuration of the MFP 20A. Therefore, the MFP 20 will be described below as a representative example of the plurality of MFPs included in the image forming system 10.

Figure 2:
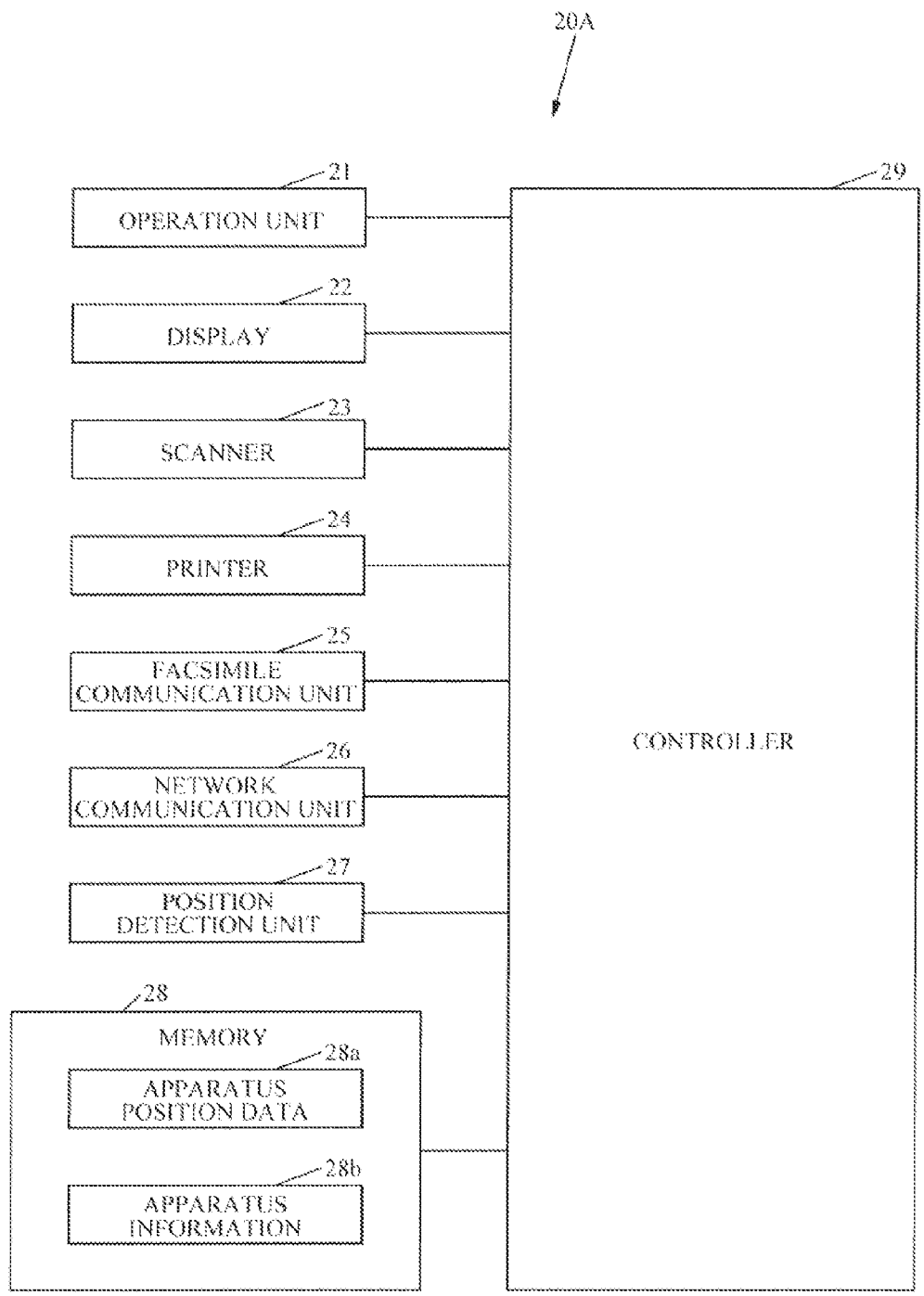
FIG. 2 illustrates a configuration of one of multifunction peripherals (MFPs) in FIG. 1.

FIG. 2 illustrates a configuration of the MFP 20A.

As illustrated in FIG. 2, the MFP 20A includes an operation unit 21, a display 22, a scanner 23, a printer 24, a facsimile communication unit 25, a network communication unit 26, a position detection unit 27, a memory 28, and a controller 29. The operation unit 21 is an input device, such as a button. The operation unit 21 can accept various operations inputted by a user. The display 22, such as a liquid crystal display (LCD), displays information of various types. The scanner 23 reads an image of a document. The printer 24 performs printing on a recording medium, such as a sheet of paper. The facsimile communication unit 25 performs facsimile communication with an external facsimile apparatus using a communication line, such as a public telephone line. The network communication unit 26 communicates with an external apparatus over the network 11 (see FIG. 1). The position detection unit 27, such as a global positioning system (GPS) receiver, detects the current position of the MFP 20A in real space. The memory 28, which is a nonvolatile memory, such as an electrically erasable programmable read only memory (EEPROM) or a hard disk drive (HDD), stores data of various types. The controller 29 controls the entire MFP 20A.

The operation unit 21 may include an input device that forms a touch panel together with the display 22.

Figure 3:
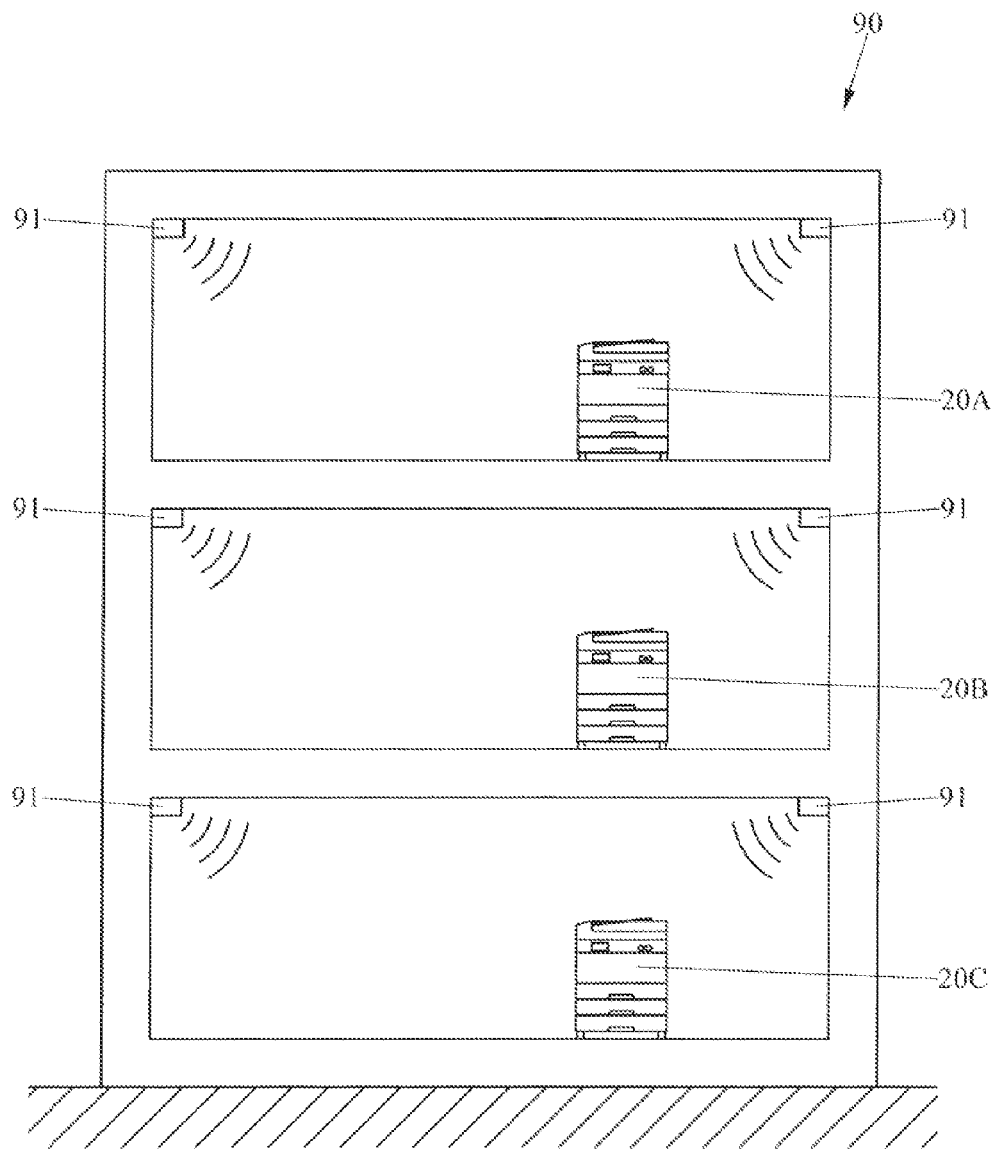
FIG. 3 illustrates a cross section of a building in which the MFPs in FIG. 1 are installed.

FIG. 3 illustrates a cross section of a building 90 in which the MFPs of the image forming system 10 (see FIG. 1) are installed.

As illustrated in FIG. 3, the building 90 has a plurality of floors. Each floor of the building 90 is equipped with floor information transmitters 91 that transmit information indicating the floor by radio. Therefore, regarding the current position in the height direction, the position detection unit 27 illustrated in FIG. 2 is able to detect the current position of the MFP 20A with respect to the vertical direction, which indicates the floor of the building 90 on which the MFP 20A is installed, by receiving information that has been transmitted from the floor information transmitters 91. Note that, regarding the current position in the vertical direction, the position detection unit 27 may be configured to detect the current position of the MFP 20A in the vertical direction, which indicates the floor of the building 90 on which the MFP 20A is installed, based on the specification made by a user via the operation unit 21, for example.

As illustrated in FIG. 2, the memory 28 stores apparatus position data 28a that indicates the position of the MFP 20A in real space and apparatus information 28b on the MFP 20A, such as the model name, performance, current condition, and the like of the MFP 20A.

The controller 29 includes a central processing unit (CPU), a read only memory (ROM) that stores a program and data of various types, and a random access memory (RAM) that is used as a work space of the CPU, for example. The CPU executes the program stored in the ROM or in the memory 28.

The controller 29 detects, when a specific operation has been inputted via the operation unit 21, or regularly, the current position by using the position detection unit 27 and causes the memory 28 to store the current position as the apparatus position data 28a.

Furthermore, the controller 29 transmits the apparatus position data 28a and apparatus information 28b stored in the memory 28 to the management server 30 via the network communication unit 26, when the apparatus position data 28a or apparatus information 28b has some change, when a specific operation has been inputted via the operation unit 21, in response to a request made by the management server 30 (see FIG. 1) via the network communication unit 26, or regularly.

Figure 4:
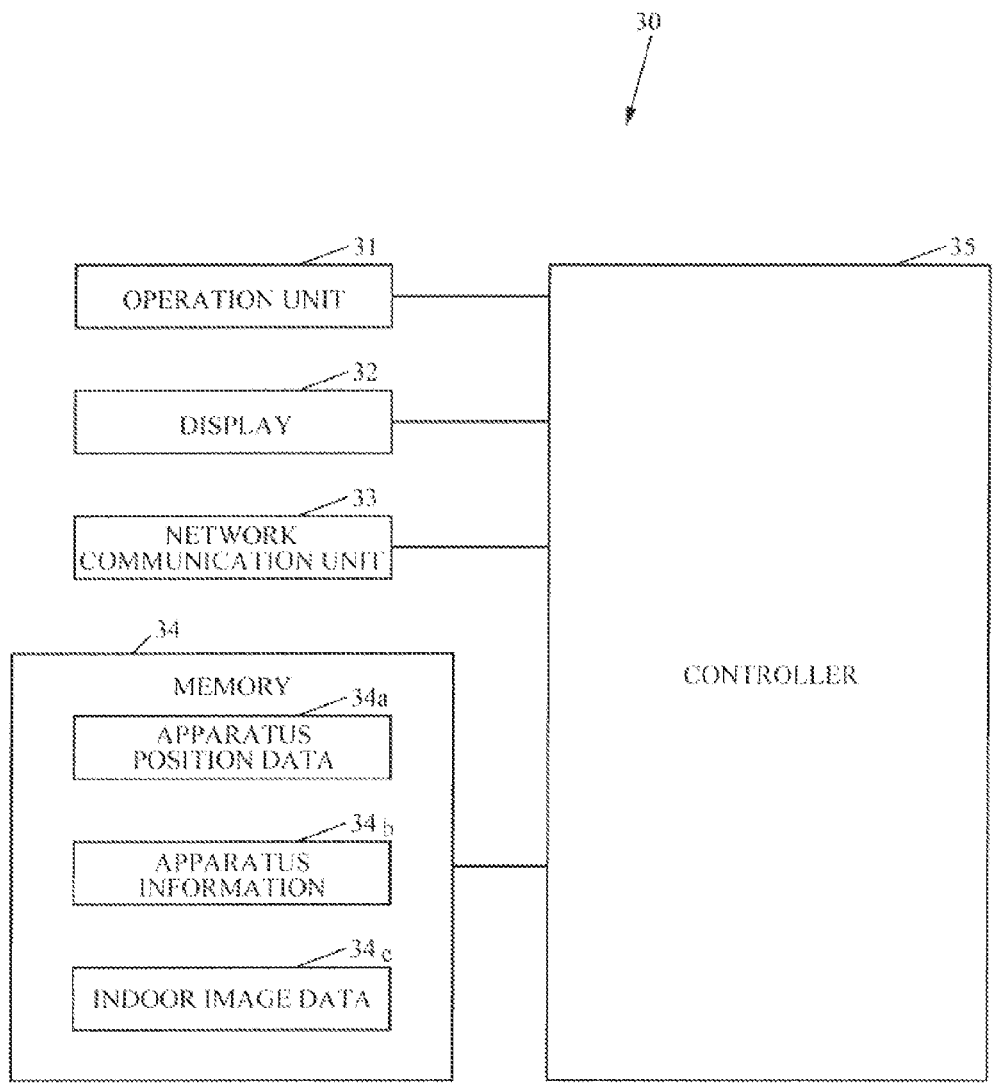
FIG. 4 illustrates a configuration of a management server in FIG. 1.

FIG. 4 illustrates a configuration of the management server 30.

As illustrated in FIG. 4, the management server 30 includes an operation unit 31, a display 32, a network communication unit 33, a memory 34, and a controller 35. Via the operation unit 31, such as a mouse or a keyboard, various operations are inputted. The display 32, such as an LCD, displays information of various types. The network communication unit 33 communicates with an external apparatus over the network 11 (see FIG. 1). The memory 34, which is a nonvolatile memory, such as an HDD, stores a program and data of various types. The controller 35 controls the entire management server 30.

The memory 34 is able to store, for each MFP, apparatus position data 34a that indicates the position of the MFP in real space and apparatus information 34b on the MFP, such as the model name, performance, current condition, and the like of the MFP.

Furthermore, the memory 34 stores indoor image data 34c that represents an indoor image of the building 90 (see FIG. 3). An indoor image may be a computer graphic or a photograph, for example. An image of an MFP installed in the building 90 is also included as an indoor image.

The controller 35 includes a CPU, a ROM that stores a program and data of various types, and a RAM that is used as a work space of the CPU, for example. The CPU executes the program stored in the ROM or in the memory 34.

The controller 35 receives, via the network communication unit 33, apparatus position data and apparatus information that have been transmitted from an MFP, and causes the memory 34 to store the apparatus position data and apparatus information as the apparatus position data 34a and apparatus information 34b respectively.

Figure 5:
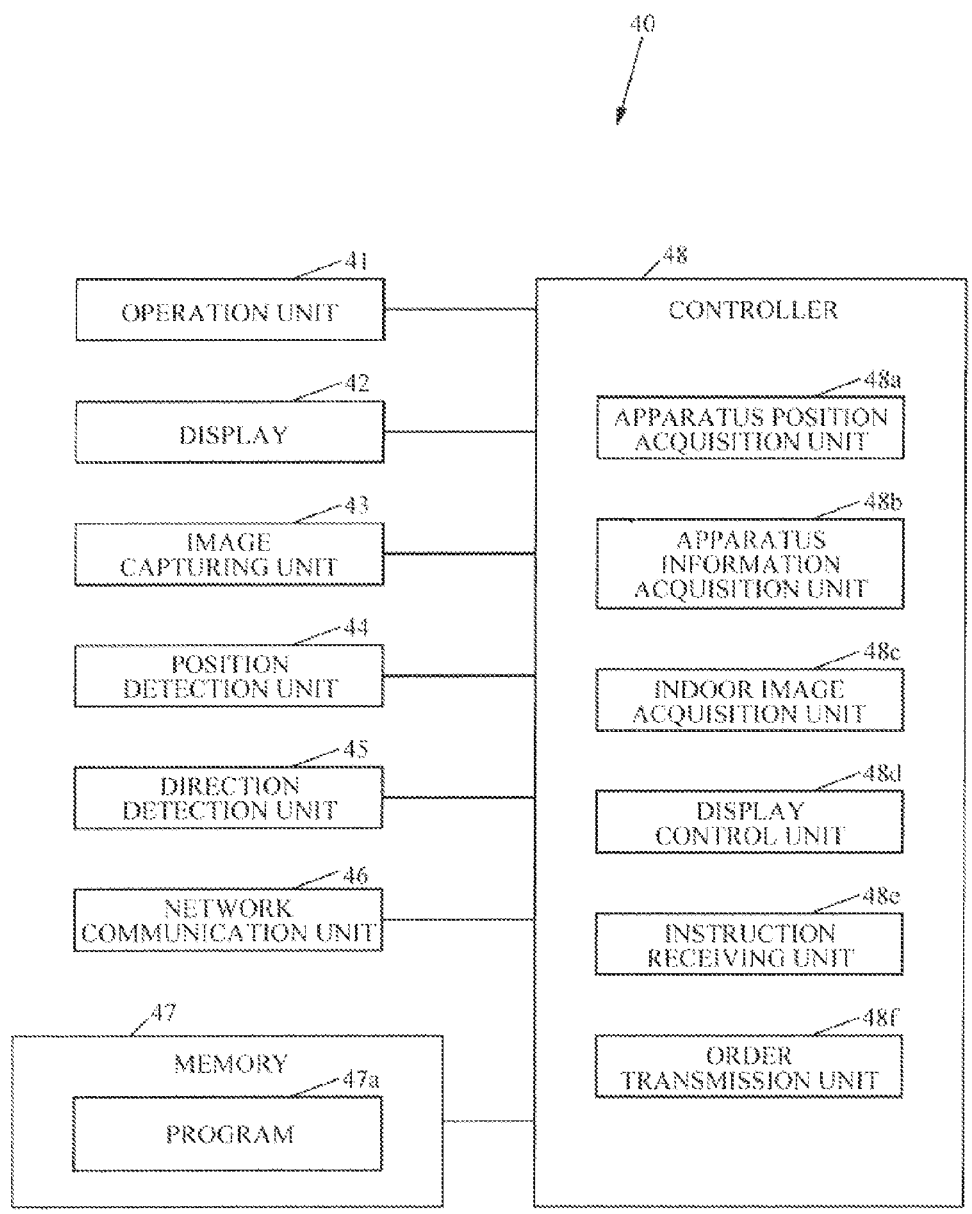
FIG. 5 illustrates a configuration of a portable apparatus in FIG. 1.

FIG. 5 illustrates a configuration of the portable apparatus 40.

As illustrated in FIG. 5, the portable apparatus 40 includes an operation unit 41, a display 42, an image capturing unit 43, a position detection unit 44, a direction detection unit 45, a network communication unit 46, a memory 47, and a controller 48. Via the operation unit 41, such as a button, various operations are inputted. The display 42, such as an LCD, displays information of various types. The image capturing unit 43 captures a still image or a moving image. The position detection unit 44, such as a GPS receiver, detects the current position of the portable apparatus 40 in real space. The direction detection unit 45, such as an acceleration sensor, detects the current direction in which the portable apparatus 40 is oriented in real space. The network communication unit 46 communicates with an external apparatus over the network 11 (see FIG. 1). The memory 47, which is a nonvolatile memory, such as an HDD, stores a program and data of various types. The controller 48 controls the entire portable apparatus 40.

The operation unit 41 may include an input device that forms a touch panel together with the display 42.

Regarding the current position in the vertical direction, the position detection unit 44 is able to detect the current position of the portable apparatus 40 in the vertical direction, which indicates the floor of the building 90 (see FIG. 3) where the portable apparatus 40 is present, by receiving information that has been transmitted from the floor information transmitters 91 (see FIG. 3). Note that, regarding the current position in the vertical direction, the position detection unit 44 may be configured to detect the current position of the portable apparatus 40 in the vertical direction, which indicates the floor of the building 90 where the portable apparatus 40 is present, based on the specification made by a user via the operation unit 41, for example.

The memory 47 stores a program 47a for a portable apparatus which is executed by the controller 48.

The controller 48 includes a CPU, a ROM that stores a program and data of various types, and a RAM that is used as a work space of the CPU, for example. The CPU executes the program stored in the ROM or in the memory 47.

The controller 48 functions, by executing the program 47a stored in the memory 47, as an apparatus position acquisition unit 48a that acquires the position of a target MFP in real space as apparatus position data, as an apparatus information acquisition unit 48*b* that acquires apparatus information on a target MFP, and as an indoor image acquisition unit 48*c* that acquires an indoor image of the building 90 (see FIG. 3) as indoor image data.

The controller 48 functions, by executing the program 47*a* stored in the memory 47, as a display control unit 48*d* that causes the display 42 to display a composite image formed by combining additional information based on apparatus information on an MFP which has been acquired by the apparatus information acquisition unit 48*b* with a to-be-combined image, while linking the additional information to the position of the MFP in the to-be-combined image, this position corresponding to the relationship between the position of the MFP in real space which has been acquired by the apparatus position acquisition unit 48*a* and the position of the portable apparatus 40 in real space which has been detected by the position detection unit 44.

Furthermore, the controller 48 functions, by executing the program 47*a* stored in the memory 47, as an instruction receiving unit 48*e* that receives an instruction on additional information, in a composite image, based on apparatus information on an MFP, the display control unit 48*d* making the display 42 display the composite image, and as an order transmission unit 48*f* that transmits an order, to the MFP, based on an instruction received by the instruction receiving unit 48*e*.

Next, operations of the image forming system 10 will be described.

First, operations of the portable apparatus 40 to be performed in the situation of causing the display 42 to display a composite image formed of additional information based on apparatus information on a target MFP and a to-be-combined image will be described.

Figure 6:
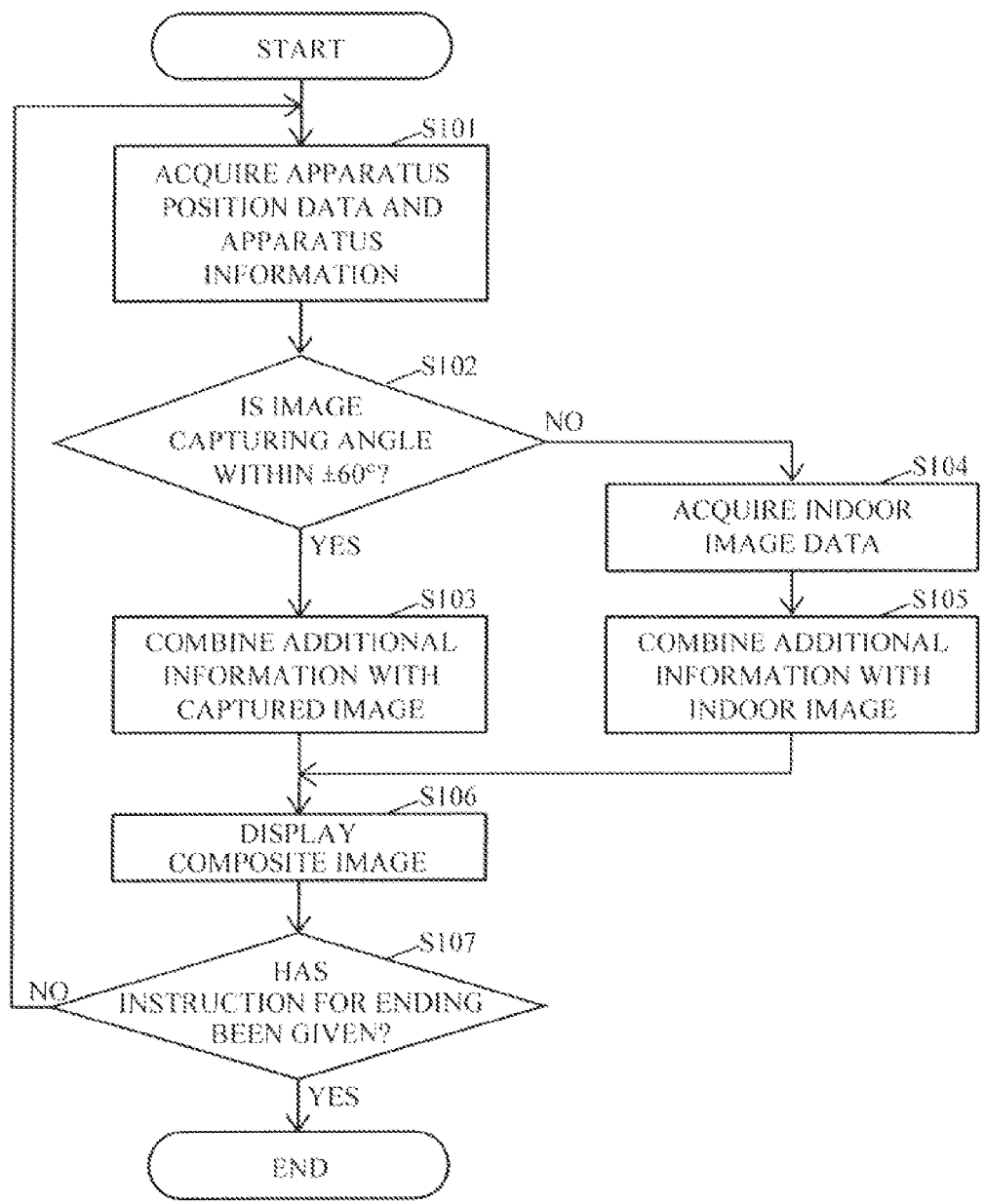
FIG. 6 illustrates a procedure performed by the portable apparatus illustrated in FIG. 5 for displaying a composite image.

The controller 48 of the portable apparatus 40 starts the operations illustrated in FIG. 6 by executing the program 47*a* based on instructions given via the operation unit 41.

FIG. 6 illustrates a procedure performed by the portable apparatus 40 for making the display 42 display a composite image formed of additional information based on apparatus information on a target MFP and a to-be-combined image.

As illustrated in FIG. 6, the apparatus position acquisition unit 48*a* and apparatus information acquisition unit 48*b* of the controller 48 in the portable apparatus 40 transmit, to the management server 30 via the network communication unit 46, information about the current position of the portable apparatus 40 in real space which has been detected by the position detection unit 44 and the current direction in which the portable apparatus 40 is oriented in real space, which has been detected by the direction detection unit 45. As a result, the apparatus position acquisition unit 48*a* and apparatus information acquisition unit 48*b* acquire, from the management server 30 via the network communication unit 46, apparatus position data and apparatus information on any MFP that is present in an area at a certain distance from the portable apparatus 40 and in the range of the angle, in the horizontal direction, of image capturing performed by the image capturing unit 43 (S101).

Next, the controller 48 determines whether or not the image capturing angle of the image capturing unit 43 relative to the horizontal plane in real space falls within a range of between 60° in the upward direction and 60° in the downward direction (S102).

If it is determined in S102 that the image capturing angle of the image capturing unit 43 relative to the horizontal plane in real space falls within the range of between 60° in the upward direction and 60° in the downward direction, the display control unit 48*d* of the controller 48 generates a composite image formed by combining additional information based on the apparatus information on an MFP which has been acquired in S101 with a to-be-combined image, that is, a captured image captured by the image capturing unit 43, while linking the additional information to the position of the MFP in the to-be-combined image (S103).

If it is determined in S102 that the image capturing angle of the image capturing unit 43 relative to the horizontal plane in real space does not fall within the range of between 60° in the upward direction and 60° in the downward direction, that is, the image capturing angle of the image capturing unit 43 relative to the horizontal plane in real space exceeds 60° in the upward direction or the image capturing angle of the image capturing unit 43 relative to the horizontal plane in real space exceeds 60° in the downward direction, the indoor image acquisition unit 48*c* of the controller 48 acquires indoor image data of the floor that is located in the direction in which the image capturing unit 43 is oriented. More specifically, the indoor image acquisition unit 48*c* transmits, to the management server 30 via the network communication unit 46, information about the current position of the portable apparatus 40 in real space which has been detected by the position detection unit 44 and the current direction in which the portable apparatus 40 is oriented in real space, which has been detected by the direction detection unit 45. As a result, the indoor image acquisition unit 48*c* acquires, from the management server 30 via the network communication unit 46, indoor image data that represents an indoor image of the location on the floor located relative to the floor where the portable apparatus 40 is currently present, in the direction in which the image capturing unit 43 is oriented relative to the horizontal plane in real space, the location corresponding to the position of the portable apparatus 40 in the horizontal direction in real space and the direction in which the image capturing unit 43 is oriented in real space (S104). In other words, in the situation where the image capturing unit 43 is inclined upward relative to the horizontal plane, the indoor image acquisition unit 48*c* acquires an indoor image of the location on the floor above the floor where the portable apparatus 40 is currently present, the location corresponding to the position of the portable apparatus 40 in the horizontal direction in real space and the direction in which the image capturing unit 43 is oriented in real space. In the situation where the image capturing unit 43 is inclined downward relative to the horizontal plane, the indoor image acquisition unit 48*c* acquires an indoor image of the location on the floor below the floor where the portable apparatus 40 is currently present, the location corresponding to the position of the portable apparatus 40 in the horizontal direction in real space and the direction in which the image capturing unit 43 is oriented in real space.

Next, the display control unit 48*d* generates a composite image formed by combining additional information based on the apparatus information on the MFP which has been acquired in S101 with a to-be-combined image, that is, the indoor image that has been acquired in S104, while linking the additional information to the position of the MFP in the to-be-combined image (S105).

After the processing in S103 or S105, the display control unit 48*d* causes the display 42 to display the composite image that has been generated in S103 or S105 (S106).

Next, the controller 48 determines whether or not an instruction for ending has been given via the operation unit 41 (S107).

If the controller 48 determines that an instruction for ending has not been given in S107, the procedure returns to the processing in S101.

If the controller 48 determines that an instruction for ending has been given in S107, the operations illustrated in FIG. 6 end.

Next, operations of the portable apparatus 40 to be performed in the situation of controlling an MFP based on a composite image displayed on the display 42 will be described.

Figure 7:
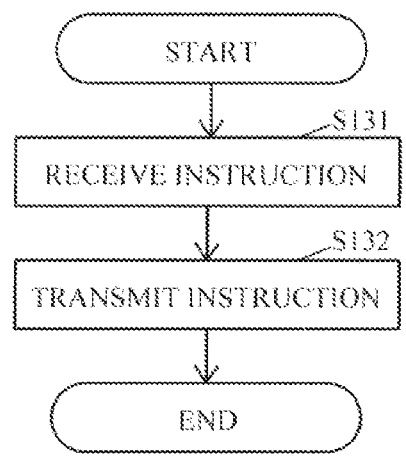
FIG. 7 illustrates a procedure performed by the portable apparatus illustrated in FIG. 5 for controlling an MFP.

FIG. 7 illustrates a procedure performed by the portable apparatus 40 for controlling an MFP based on a composite image displayed on the display 42.

As illustrated in FIG. 7, the instruction receiving unit 48*e* of the controller 48 in the portable apparatus 40 receives an instruction on additional information in the composite image displayed on the display 42 in S106 (S131).

Next, the order transmission unit 48*f* of the controller 48 transmits, to the management server 30 via the network communication unit 46, an order, for the MFP, based on the instruction that has been received in S131 (S132), and the operations illustrated in FIG. 7 end.

The controller 35 of the management server 30 controls the MFP based on the order that has been received from the portable apparatus 40 via the network communication unit 33.

An example will be described below in which a user is present on the second floor of the building 90 while carrying the portable apparatus 40 in a state where the MFPs 20A, 20B, and 20C are present on the third, second, and first floors of the building 90 respectively, as illustrated in FIG. 3.

Figure 8A:
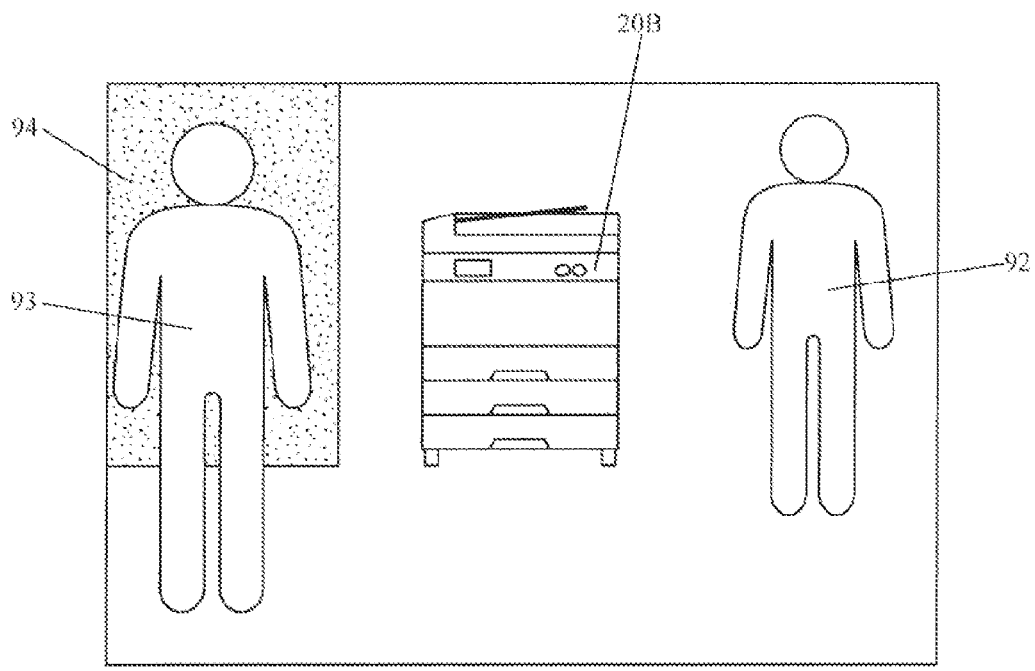
FIG. 8A illustrates an example of a captured image captured in a direction toward an MFP that is present on the same floor in a building.
Figure 8B:
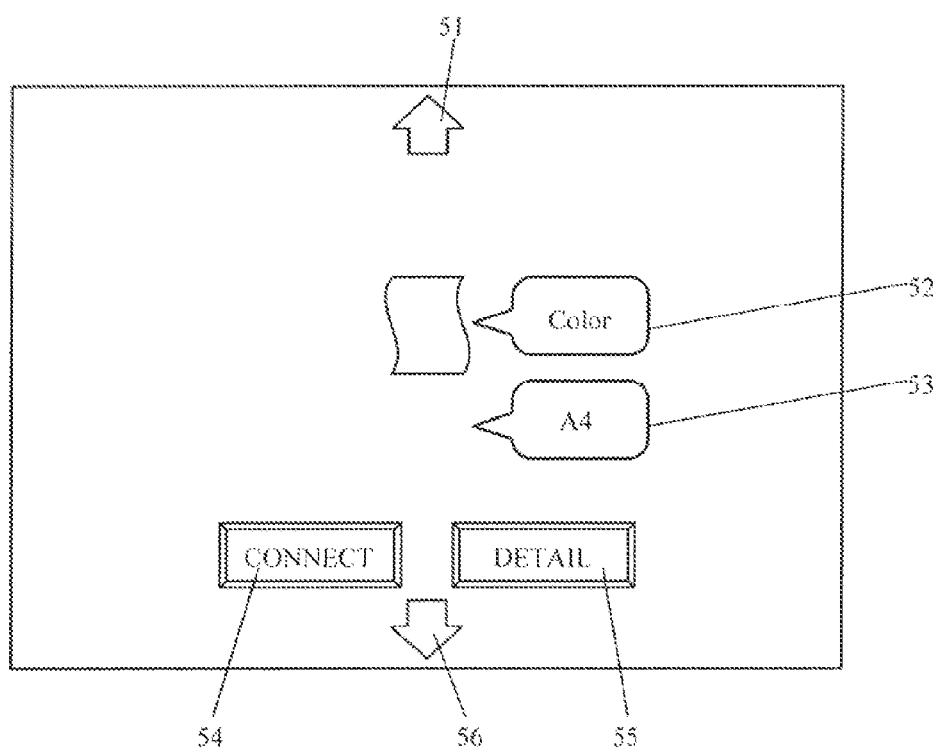
FIG. 8B illustrates an example of additional information to be combined with the captured image.
Figure 9:
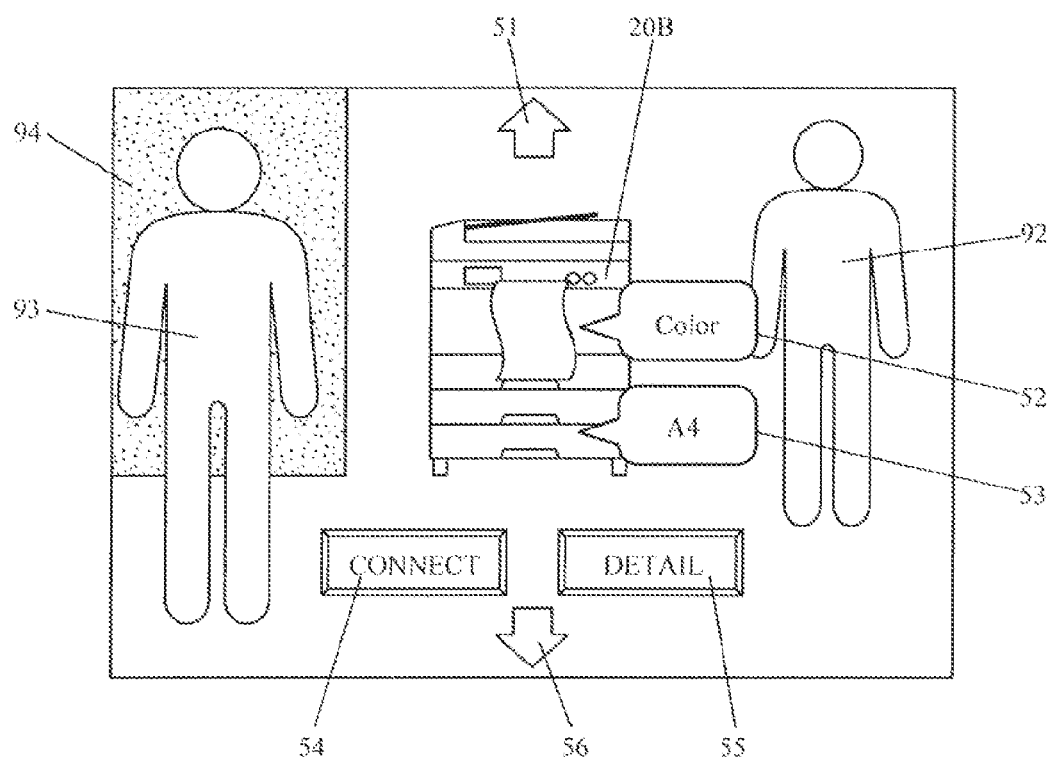
FIG. 9 illustrates an example of a composite image formed of a captured image and additional information.

FIG. 8A illustrates an example of a captured image captured by the image capturing unit 43 of the portable apparatus 40 in a direction toward the MFP 20B that is present on the same floor in the building 90. FIG. 8B illustrates an example of additional information to be combined with the captured image in FIG. 8A. FIG. 9 illustrates an example of a composite image formed of the captured image in FIG. 8A and the additional information in FIG. 8B.

In the situation where a user captures an image in the direction toward the MFP 20B that is present on the same floor in the building 90 by using the portable apparatus 40, a captured image displayed on the display 42 is as illustrated in FIG. 8A, for example. The captured image illustrated in FIG. 8A includes persons 92 and 93, a wall 94, and the like in addition to the MFP 20B.

Additional information based on apparatus information on the MFPs 20A, 20B, and 20C which has been acquired in S101 is as illustrated in FIG. 8B, for example.

Additional information based on apparatus information on the MFP 20A is expressed by an up arrow sign 51. The up arrow sign 51 is a sign indicating that an MFP is present in the vicinity on an upper floor.

Additional information based on apparatus information on the MFP 20B includes a color/monochrome indicator 52, a paper size indicator 53, a connection button 54, and a detail button 55. The color/monochrome indicator 52 is an indicator indicating that a target MFP is able to perform color printing or that the target MFP is for monochrome printing only. The color/monochrome indicator 52 includes characters in a balloon which indicate that the target MFP is able to perform color printing or that the target MFP is for monochrome printing only, and an image of paper. The color/monochrome indicator 52 may be formed so as to indicate that the target MFP is able to perform color printing or that the target MFP is for monochrome printing only, by using only characters in a balloon or by using only a color of an image of paper without a balloon. The paper size indicator 53 is an indicator that indicates the size of sheets of paper stored in the target MFP. The connection button 54 is a button in order to receive an instruction to connect the portable apparatus 40 to the target MFP. The detail button 55 is a button in order to receive an instruction to display detailed information about the target MFP.

Additional information based on apparatus information on the MFP 20C is expressed by a down arrow sign 56. The down arrow sign 56 is a sign indicating that an MFP is present in the vicinity on a lower floor.

The additional information illustrated in FIG. 8B may include information that indicates the position of the MFP 20B. The position of the MFP 20B may be indicated by using coordinates, by using any indication that an administrator has registered, such as "beside the entrance of the meeting room", for example, or by using other methods.

The controller 48 of the portable apparatus 40 combines the up arrow sign 51 illustrated in FIG. 8B with the captured image illustrated in FIG. 8A in the upper portion of the captured image. The controller 48 combines the color/monochrome indicator 52, the paper size indicator 53, the connection button 54, and the detail button 55 illustrated in FIG. 8B with the captured image, while linking the indicators and buttons to the position of the MFP 20B in the captured image, which is a to-be-combined image. Furthermore, the controller 48 combines the down arrow sign 56 illustrated in FIG. 8B with the captured image in the lower portion of the captured image. Then, the controller 48 displays a composite image as illustrated in FIG. 9 on the display 42 (S103 and S106). In other words, the composite image illustrated in FIG. 9 is an image generated by using an augmented reality (AR) technique.

Figure 10A:
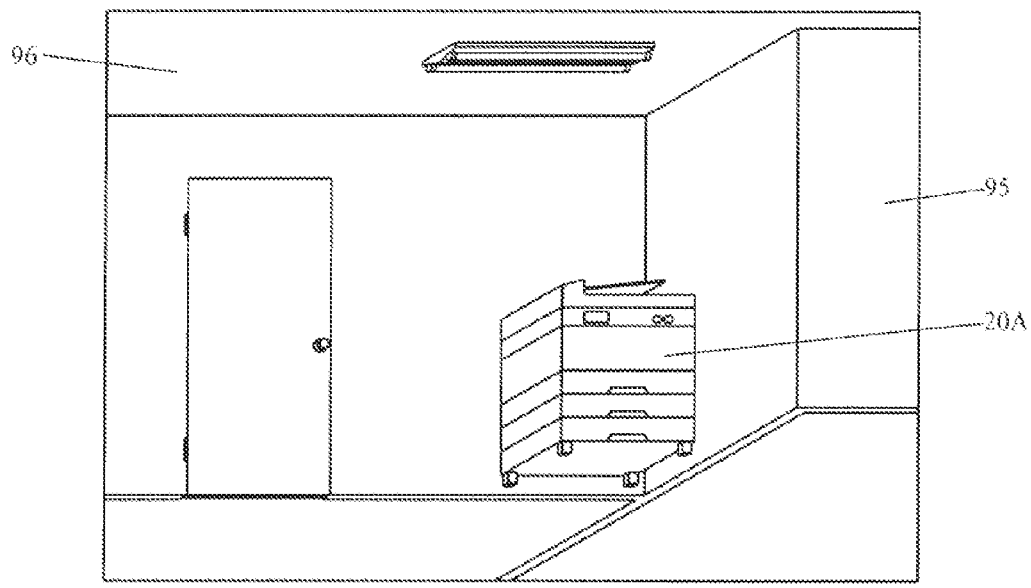
FIG. 10A is a diagram illustrating an example of an indoor image acquired by the portable apparatus in FIG. 5.
Figure 10B:
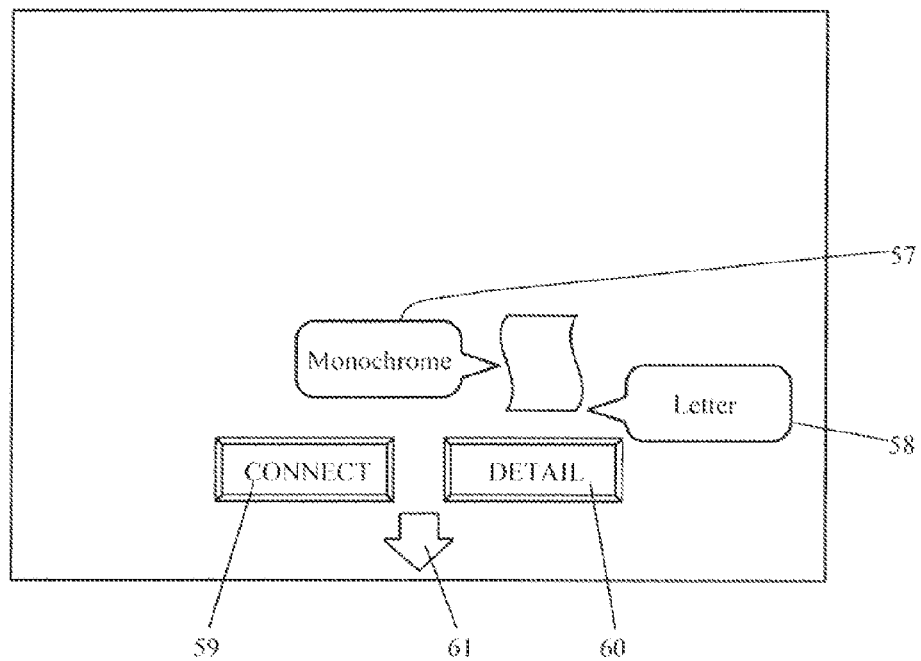
FIG. 10B illustrates an example of additional information to be combined with the indoor image.
Figure 11:
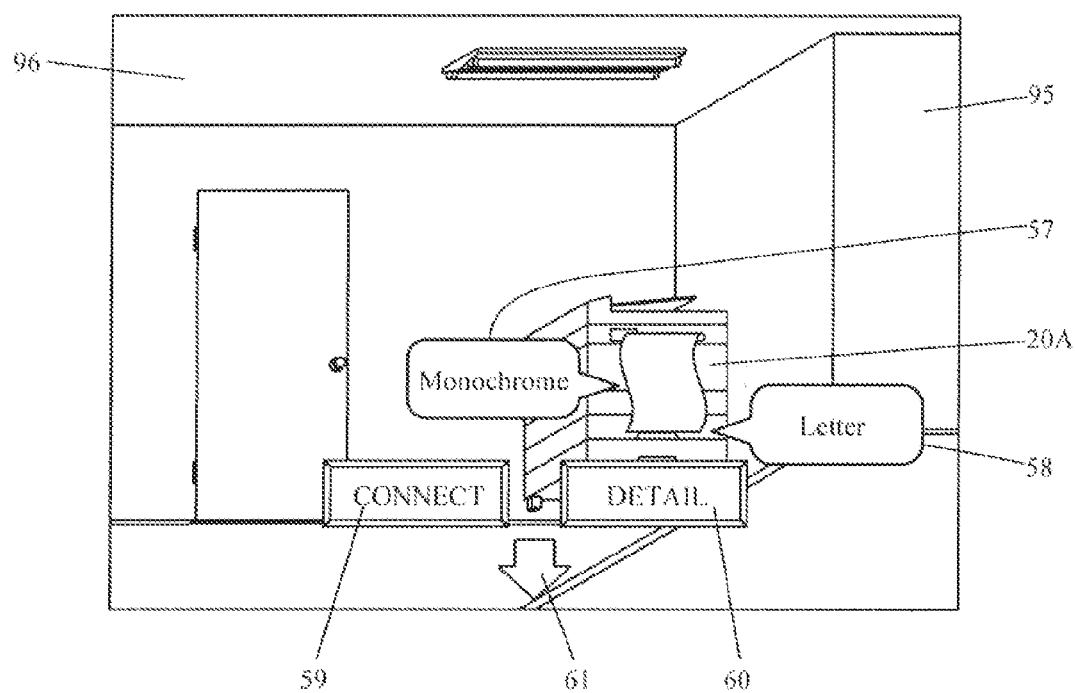
FIG. 11 illustrates an example of a composite image formed of an indoor image and additional information.

FIG. 10A illustrates an example of an indoor image acquired by the portable apparatus 40 in the situation where the image capturing unit 43 is oriented in the direction toward the MFP 20A that is present on an upper floor in the building 90. FIG. 10B illustrates an example of additional information to be combined with the indoor image in FIG. 10A. FIG. 11 illustrates an example of a composite image formed of the indoor image in FIG. 10A and the additional information in FIG. 10B.

In the situation where a user orients the image capturing unit 43 of the portable apparatus 40 in the direction toward the MFP 20A that is present on an upper floor in the building 90, an indoor image acquired in S104 is as illustrated in FIG. 10A, for example. The indoor image illustrated in FIG. 10A includes a wall 95 of the third floor, the ceiling 96 of the third floor, and the like in addition to the MFP 20A. Note that, the indoor image illustrated in FIG. 10A does not include the floor of the third floor, that is, the ceiling of the second floor by taking into consideration visibility.

Additional information based on apparatus information on the MFPs 20A and 20B acquired in S101 is as illustrated in FIG. 10B, for example.

Additional information based on the apparatus information on the MFP 20A includes a color/monochrome indicator 57, a paper size indicator 58, a connection button 59, and a detail button 60.

Additional information based on the apparatus information on the MFP 20B is expressed by a down arrow sign 61. The down arrow sign 61 is a sign indicating that an MFP is present in the vicinity on a lower floor.

The additional information illustrated in FIG. 10B may include information that indicates the position of the MFP 20A. The position of the MFP 20A may be indicated by using coordinates, by using any indication that an administrator has registered, or by using other methods.

The controller 48 of the portable apparatus 40 combines the color/monochrome indicator 57, the paper size indicator 58, the connection button 59, and the detail button 60 illustrated in FIG. 10B with the indoor image illustrated in FIG. 10A, while linking the indicators and buttons to the position of the MFP 20A in the indoor image, which is a to-be-combined image. Furthermore, the controller 48 combines the down arrow sign 61 illustrated in FIG. 10B with the indoor image in the lower portion of the indoor image. Then, the controller 48 displays a composite image as illustrated in FIG. 11 on the display 42 (S105 and S106). In other words, the composite image illustrated in FIG. 11 is an image generated by using a virtual reality (VR) technique.

Note that the controller 48 may be configured to additionally combine a captured image actually captured by the image capturing unit 43 with the composite image illustrated in FIG. 11, while making the captured image semitransparent. More specifically, a captured image of the ceiling of the second floor which has been made semitransparent may be additionally combined with the composite image illustrated in FIG. 11. In this case, the eventual composite image is an image generated by using an AR technique.

Figure 12A:
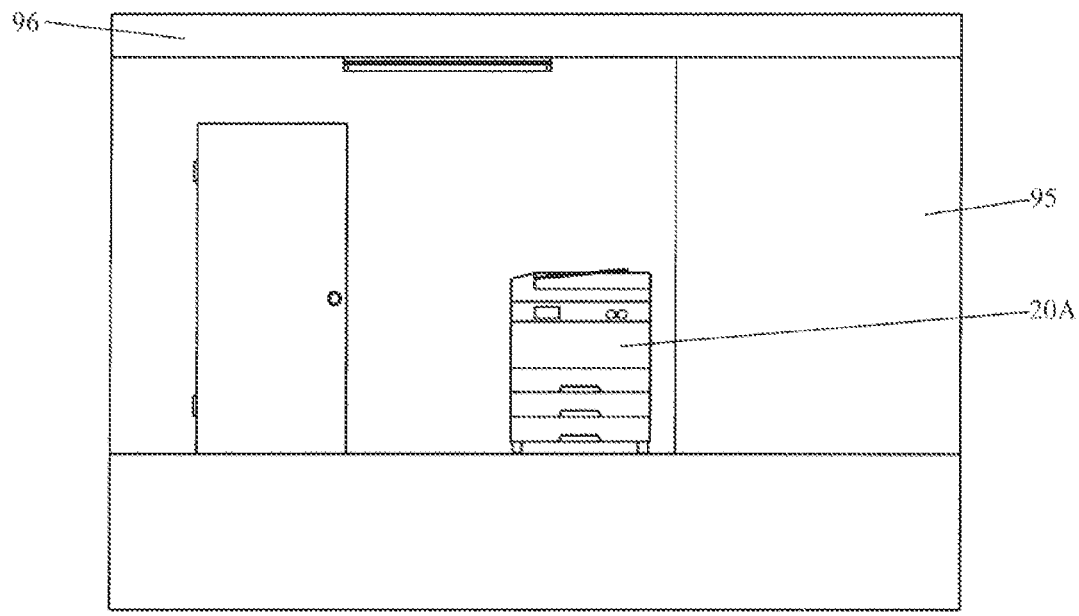
FIG. 12A is a diagram illustrating an example of an indoor image acquired by the portable apparatus illustrated in FIG. 5.
Figure 12B:
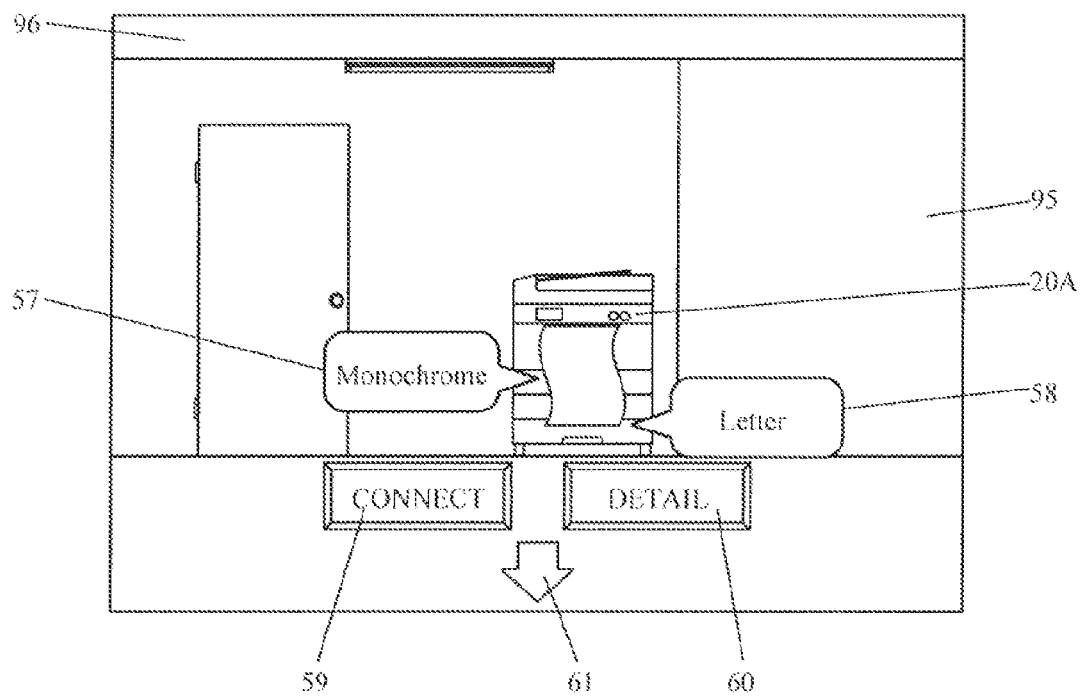
FIG. 12B illustrates an example of a composite image formed by combining additional information with the indoor image.

FIG. 10A and FIG. 11 are diagrams illustrating a state of looking up at the third floor from the second floor, however, the controller 48 is able to perform display as if a user is on the third floor as illustrated in FIGS. 12A and 12B.

FIG. 12A illustrates an example of an indoor image acquired by the portable apparatus 40 in the situation where the image capturing unit 43 is oriented in the direction toward the MFP 20A that is present on an upper floor in the building 90. FIG. 12B illustrates an example of a composite image formed of the indoor image in FIG. 12A and additional information.

The controller 48 combines the color/monochrome indicator 57, the paper size indicator 58, the connection button 59, and the detail button 60 with the indoor image illustrated in FIG. 12A, while linking the indicators and buttons to the position of the MFP 20A in the indoor image, which is a to-be-combined image. Furthermore, the controller 48 combines the down arrow sign 61 with the indoor image in the lower portion of the indoor image. Then, the controller 48 displays a composite image as illustrated in FIG. 12B on the display 42 (S105 and S106). In other words, the composite image illustrated in FIG. 12B is an image generated by using a VR technique.

As described above, if the image capturing unit 43 is inclined upward such that the direction in which the image capturing unit 43 is oriented in real space exceeds a certain angle (for example 60°) relative to the horizontal plane (NO in S102), the portable apparatus 40 displays a composite image on the display 42 (S106) by combining, with an indoor image of a location on an upper floor located above the floor where the portable apparatus 40 is currently present, the location corresponding to the position of the portable apparatus 40 in the horizontal direction in real space and the direction in which the image capturing unit 43 is oriented in real space (S104), additional information based on apparatus information on the MFP in the indoor image, while linking the additional information to the position of the MFP in the indoor image (S105). A description has been given of the situation of the upward direction, which is also applicable to the situation of the downward direction. In this way, the portable apparatus 40 is able to cause a user to aware of an MFP with additional information based on apparatus information on the MFP installed on a floor different from the floor where the portable apparatus 40 is currently present, and is also able to cause a user easily to reach the vicinity of the MFP with an indoor image of the vicinity of the MFP.

Accordingly, in the situation where a user desires to perform color printing, for example, if any MFP installed on the floor where the user is currently present is not a printer that is able to perform color printing, the user is able to easily check an MFP on an upper floor and additional information based on apparatus information on the MFP, in an indoor image of the upper floor displayed on the display 42, by the simple operation of orienting the image capturing unit 43 of the portable apparatus 40 toward the upper floor. In this way, a user is able to easily find an MFP on an upper floor which is able to perform color printing without moving to other floors, which is particularly helpful in the situation where a user does not know the location of installation, performance, or the like of an MFP, such situation where a user visits the building 90 for the first time. A description has been given of the situation of the upper floor, which is also applicable to the lower floor.

The portable apparatus 40 indicates the presence of an MFP with the up arrow sign where an MFP is present on an upper floor located above the floor that is a target to be displayed in a to-be-combined image, at a location located above the location that is a target to be displayed in the to-be-combined image, which makes it possible to cause a user easily to aware of the presence of the MFP. A description has been given of the situation of the upward direction, which is also applicable to the downward direction.

The portable apparatus 40 is able to transmit, to an MFP, an order (S132) based on an instruction on additional information based on apparatus information on the MFP (S131). Accordingly, the portable apparatus 40 is able to operate not only an MFP installed on the floor where the portable apparatus 40 is currently present but also an MFP installed on a floor different from the floor where the portable apparatus 40 is currently present.

The portable apparatus 40 is able to, after making an MFP installed on a floor different from the floor where the portable apparatus 40 is currently present perform printing, cause a user easily to reach the vicinity of the MFP with an indoor image of the vicinity of the MFP in order for the user to get a printout from the MFP. In other words, where a user makes an MFP installed on a floor different from the floor where the user is currently present perform printing, the user is able to intuitively know the approximate position of the MFP, from the position of the user at the time when the user has given an instruction for printing and the direction in which the image capturing unit 43 is oriented. Furthermore, a user is able to know the way to the MFP, from an indoor image of the vicinity of the MFP. Therefore, a user is able to reach the vicinity of the MFP in a short time without getting lost.

Note that although the image forming system 10 includes the management server 30 in an embodiment, an MFP itself may function as the management server 30. In other words, the portable apparatus 40 may receive apparatus position data and apparatus information on an MFP directly from the MFP, may receive indoor image data directly from an MFP, or may transmit an order for an MFP directly to the MFP.

In the image forming system 10, the portable apparatus 40 acquires indoor image data from the management server 30. However, the portable apparatus 40 may store indoor image data in the memory 47 in advance and the indoor image acquisition unit 48 may acquire the indoor image data from the memory 47.

The apparatus information display system includes an MFP as an electronic apparatus in an embodiment, however, the apparatus information display system of the present disclosure may include an image forming apparatus other than an MFP, such as a printer, a copier, or a facsimile machine, as an electronic apparatus of the present disclosure. The apparatus information display system of the present disclosure may include an electronic apparatus other than an image forming apparatus as an electronic apparatus of the present disclosure.

Another embodiment of the present disclosure will be described below with reference to the drawings.

First, a configuration of an image forming system 110 that serves as an apparatus information display system according to another embodiment will be described.

Figure 13:
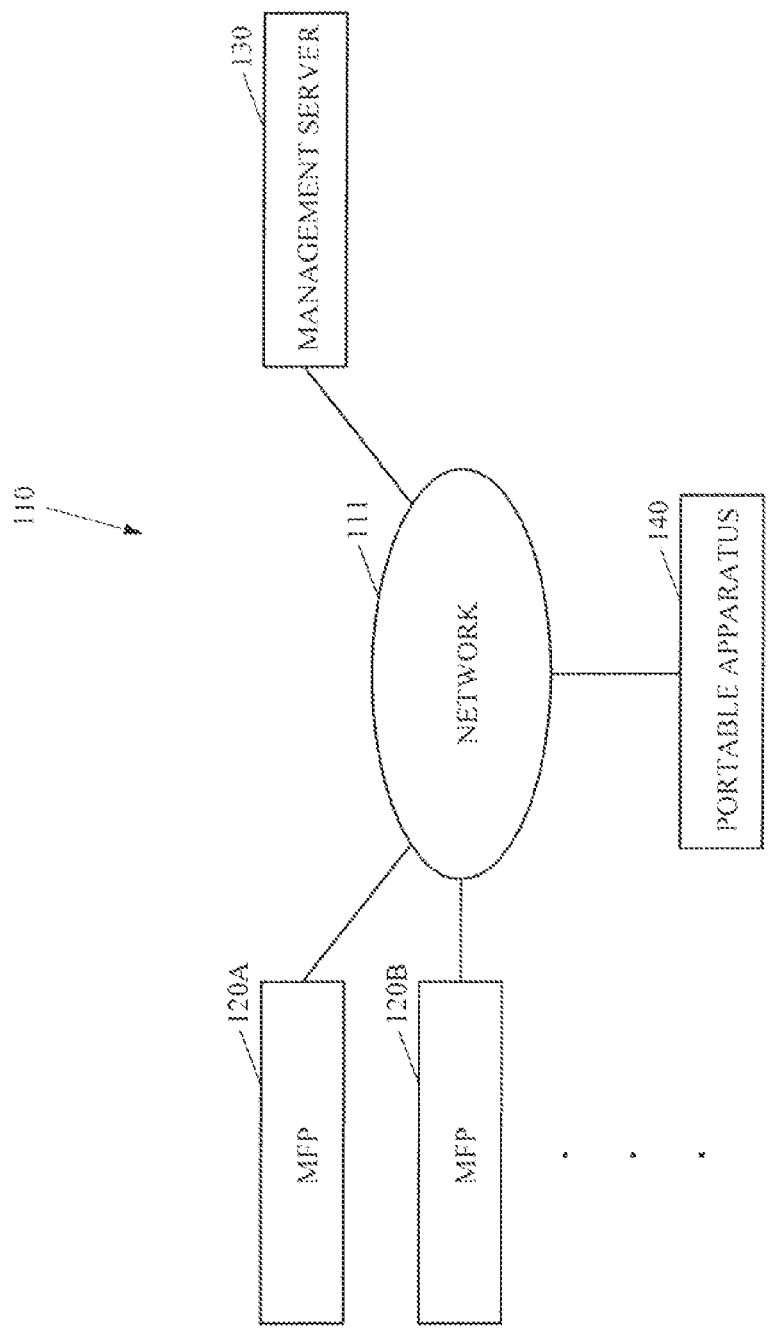
FIG. 13 is a block diagram of an image forming system according to another embodiment of the present disclosure.

FIG. 13 illustrates a configuration of the image forming system 110 according to another embodiment.

As illustrated in FIG. 13, the image forming system 110 includes a plurality of MFPs including MFPs 120A and 120B that serve as electronic apparatuses, a management server 130 that manages the plurality of MFPs including the MFPs 120A and 120B, and a portable apparatus 140, such as a smartphone, for example, which makes a composite image formed of a captured image and additional information based on apparatus information on a target MFP displayed. The plurality of MFPs including the MFPs 120A and 120B, the management server 130, and the portable apparatus 140 are connected to one another over a network 111, such as a LAN or the Internet, so as to enable communication with one another.

The configuration of each of the plurality of MFPs included in the image forming system 110 is similar to the configuration of the MFP 120A. Therefore, the MFP 120A will be described below as a representative example of the plurality of MFPs included in the image forming system 110.

Figure 14:
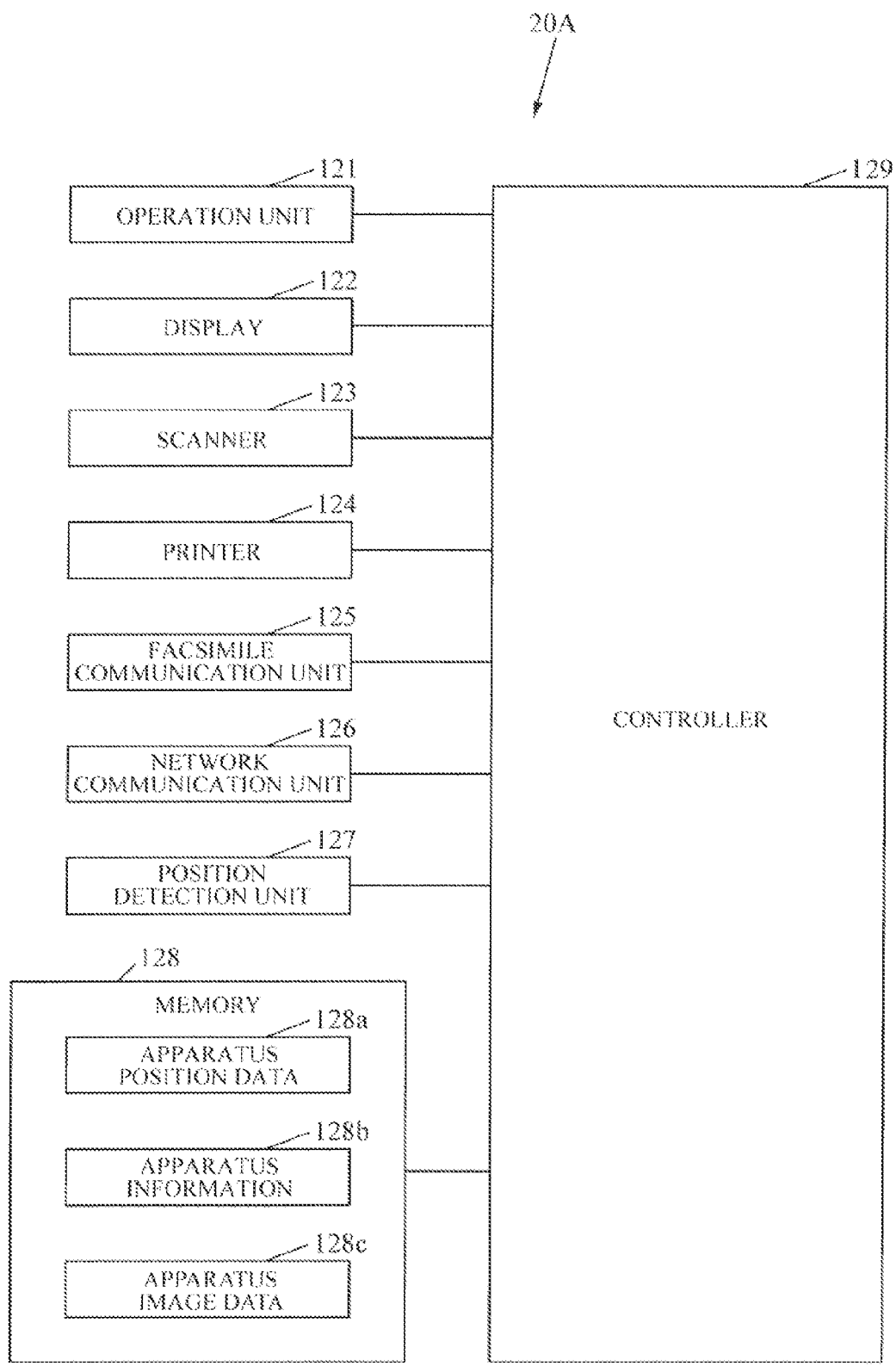
FIG. 14 illustrates a configuration of one of MFPs in FIG. 13.

FIG. 14 illustrates a configuration of the MFP 120A.

As illustrated in FIG. 14, the MFP 120A includes an operation unit 121, a display 122, a scanner 123, a printer 124, a facsimile communication unit 125, a network communication unit 126, a position detection unit 127, a memory 128, and a controller 129. The operation unit 21 is an input device, such as a button. The operation unit 21 can accept various operations inputted by a user. The display 122, such as a liquid crystal display (LCD), displays information of various types. The scanner 123 reads an image of a document. The printer 124 performs printing on a recording medium, such as a sheet of paper. The facsimile communication unit 125 performs facsimile communication with an external facsimile apparatus using a communication line, such as a public telephone line. The network communication unit 126 communicates with an external apparatus over the network 111 (see FIG. 13). The position detection unit 127, such as a global positioning system (GPS) receiver, detects the current position of the MFP 120A in real space. The memory 128, which is a nonvolatile memory, such as an electrically erasable programmable read only memory (EEPROM) or a hard disk drive (HDD), stores data of various types. The controller 129 controls the entire MFP 120A.

The operation unit 121 may include an input device that forms a touch panel together with the display 122.

Figure 15:
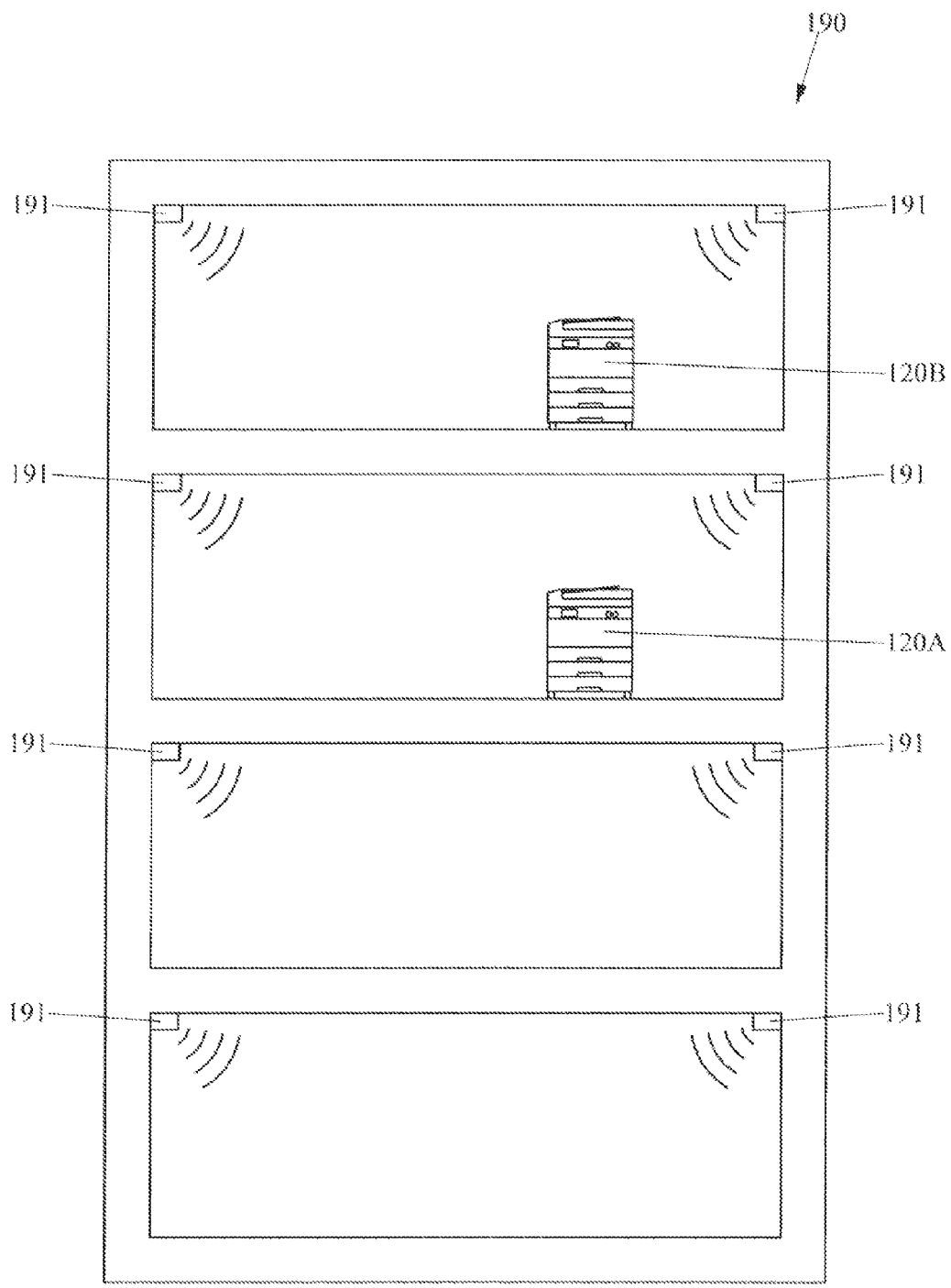
FIG. 15 illustrates a cross section of a building in which the MFPs in FIG. 13 are installed.

FIG. 15 illustrates a cross section of a building 190 in which the MFPs in the image forming system 110 (See FIG. 13).

As illustrated in FIG. 15, each floor of a building 190 is equipped with floor information transmitters 191 that transmit information indicating the floor by radio. Therefore, regarding the current position in the vertical direction, the position detection unit 127 illustrated in FIG. 14 is able to detect the current position of the MFP 120A in the vertical direction, which indicates the floor of the building 190 on which the MFP 120A is installed, by receiving information that has been transmitted from the floor information transmitters 191.

As illustrated in FIG. 14, the memory 128 stores apparatus position data 128a that indicates the position of the MFP 120A in real space, apparatus information 128b on the MFP 120A, such as the model name, performance, current condition, and the like of the MFP 120A, and apparatus image data 128c that represents an image of the MFP 120A.

The controller 129 includes a central processing unit (CPU), a read only memory (ROM) that stores a program and data of various types, and a random access memory (RAM) that is used as a work space of the CPU, for example. The CPU executes the program stored in the ROM or in the memory 128.

The controller 129 detects, when a specific operation has been inputted via the operation unit 121, or regularly, the current position by using the position detection unit 127 and causes the memory 128 to store the current position as the apparatus position data 128a.

The controller 129 transmits the apparatus position data 128a, apparatus information 128b, and apparatus image data 128c stored in the memory 128 to the management server 130 via the network communication unit 126, when the apparatus position data 128a, apparatus information 128b, or apparatus image data 128c has some change, when a specific operation has been inputted via the operation unit 121, in response to a request made by the management server 130 (see FIG. 13) via the network communication unit 126, or regularly.

Figure 16:
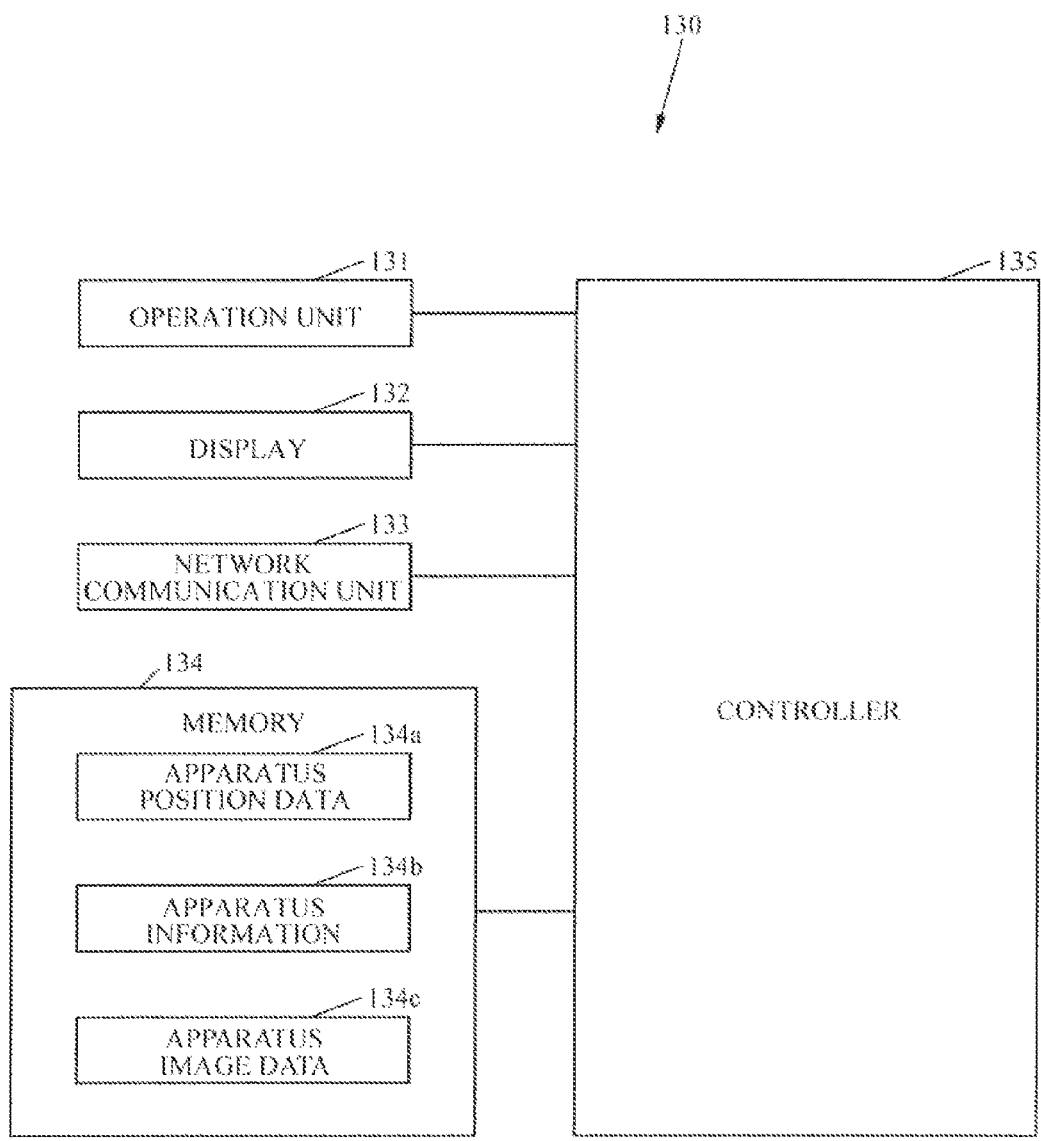
FIG. 16 illustrates a configuration of a management server in FIG. 13.

FIG. 16 illustrates a configuration of the management server 130.

As illustrated in FIG. 16, the management server 130 includes an operation unit 131, a display 132, a network communication unit 133, a memory 134, and a controller 135. Via the operation unit 131, such as a mouse or a keyboard, various operations are inputted. The display 132, such as an LCD, displays information of various types. The network communication unit 133 communicates with an external apparatus over the network 111 (see FIG. 13). The memory 134, which is a nonvolatile memory, such as an HDD, stores a program and data of various types. The controller 135 controls the entire management server 130.

The memory 134 is able to store, for each MFP, apparatus position data 134a that indicates the position of the MFP in real space, apparatus information 134b on the MFP, such as the model name, performance, current condition, and the like of the MFP, and apparatus image data 134c that represents an image of the MFP.

The controller 35 includes a CPU, a ROM that stores a program and data of various types, and a RAM that is used as a work space of the CPU, for example. The CPU executes the program stored in the ROM or in the memory 34.

The controller 135 receives, via the network communication unit 133, apparatus position data, apparatus information, and apparatus image data that have been transmitted from an MFP, and causes the memory 134 to store the apparatus position data, apparatus information, and apparatus image data as the apparatus position data 134a, apparatus information 134b, and apparatus image data 134c respectively.

Figure 17:
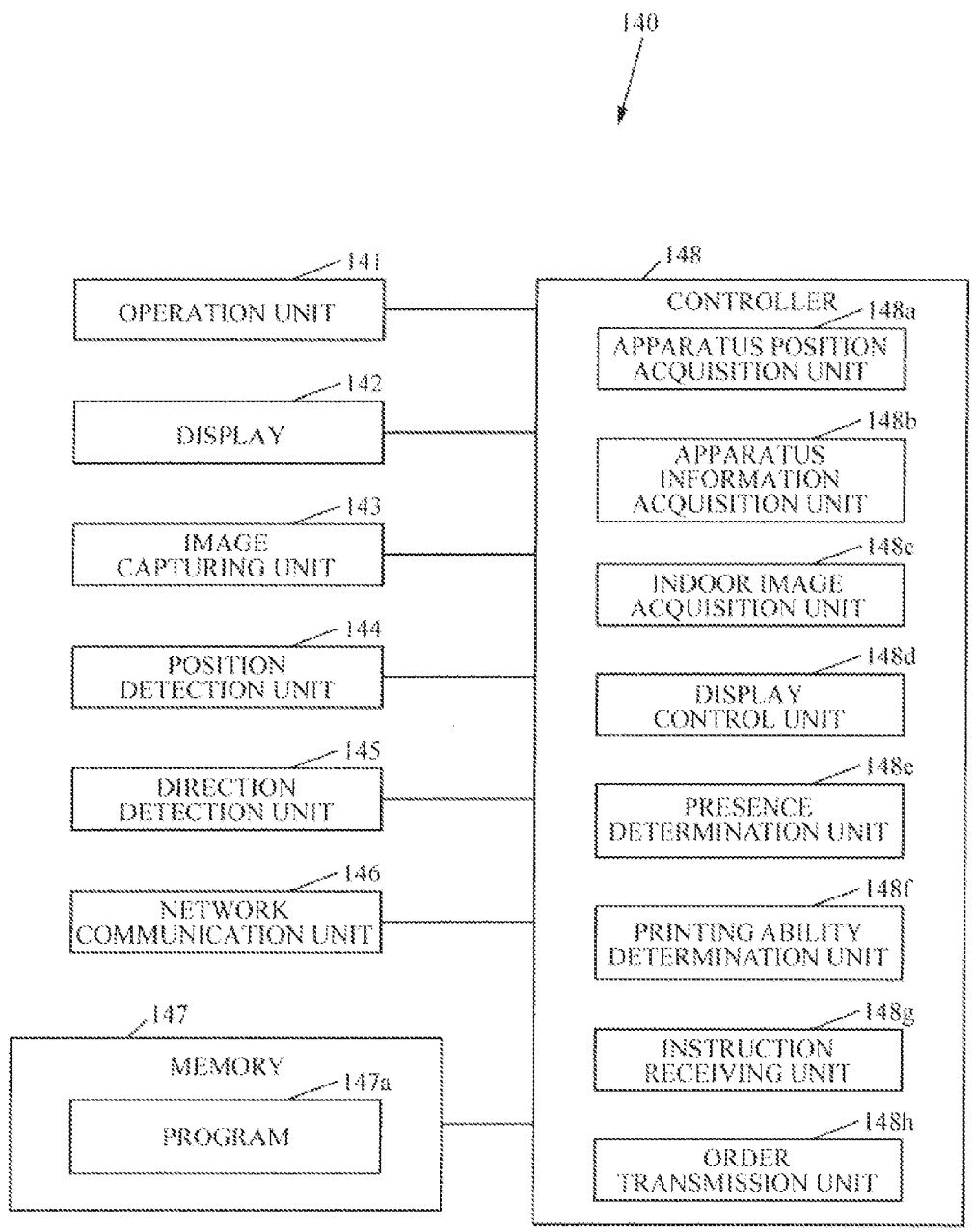
FIG. 17 illustrates a configuration of a portable apparatus in FIG. 13.

FIG. 17 illustrates a configuration of the portable apparatus 140.

As illustrated in FIG. 17, the portable apparatus 140 includes an operation unit 141, a display 142, an image capturing unit 143, a position detection unit 144, a direction detection unit 145, a network communication unit 146, a memory 147, and a controller 148. Via the operation unit 141, such as a button, various operations are inputted. The display 142, such as an LCD, displays information of various types. The image capturing unit 143 captures a still image or a moving image. The position detection unit 144, such as a GPS receiver, detects the current position of the portable apparatus 140 in real space. The direction detection unit 145, such as an acceleration sensor, detects the current direction in which the portable apparatus 140 is oriented in real space. The network communication unit 146 communicates with an external apparatus over the network 111 (see FIG. 13). The memory 147, which is a nonvolatile memory, such as an HDD, stores a program and data of various types. The controller 148 controls the entire portable apparatus 140.

The operation unit 141 may include an input device that forms a touch panel together with the display 142.

Regarding the current position in the vertical direction, the position detection unit 144 is able to detect the current position of the portable apparatus 140 in the vertical direction, which indicates the floor of the building 190 (see FIG. 15) where the portable apparatus 140 is present, by receiving information that has been transmitted from the floor information transmitters 191 (see FIG. 15).

The memory 147 stores a program 147a that is executed by the controller 148.

The controller 48 includes a CPU, a ROM that stores a program and data of various types, and a RAM that is used as a work space of the CPU, for example. The CPU executes the program stored in the ROM or in the memory 47.

The controller 148 functions, by executing the program 147a stored in the memory 147, as an apparatus position acquisition unit 148a that acquires the position of a target MFP in real space as apparatus position data, as an apparatus information acquisition unit 148b that acquires apparatus information on a target MFP, and as an apparatus image acquisition unit 148c that acquires an image of the target MFP as apparatus image data.

The controller 148 functions, by executing the program 147a stored in the memory 147, as a display control unit 148d that causes the display 142 to display a composite image formed by combining additional information based on apparatus information on an MFP which has been acquired by the apparatus information acquisition unit 148b with a captured image captured by an image capturing unit 143, while linking the additional information to the position of the MFP in the captured image, this position corresponding to the relationship between the position of the MFP in real space which has been acquired by the apparatus position acquisition unit 148a and the position of the portable apparatus 140 in real space which has been detected by the position detection unit 144.

The controller 148 functions, by executing the program 147a stored in the memory 147, as a presence determination unit 148e that determines whether or not an MFP is present at the position of the MFP in a captured image by performing image processing, as a printing ability determination unit 148f that determines whether or not an MFP is able to perform a target job, which can be a print job, based on the apparatus information on the MFP that has been acquired by the apparatus information acquisition unit 148b, as an instruction receiving unit 148g that receives an instruction on additional information, in a composite image, based on apparatus information on an MFP, the display control unit 148d making the display 142 display the composite image, and as an order transmission unit 148h that transmits an order, to the MFP, based on an instruction received by the instruction receiving unit 148g.

Next, operations of the image forming system 110 will be described.

First, operations of the portable apparatus 140 to be performed in the situation of causing the display 142 to display a composite image formed of a captured image captured by the image capturing unit 143 and additional information based on apparatus information on an MFP will be described.

Figure 18:
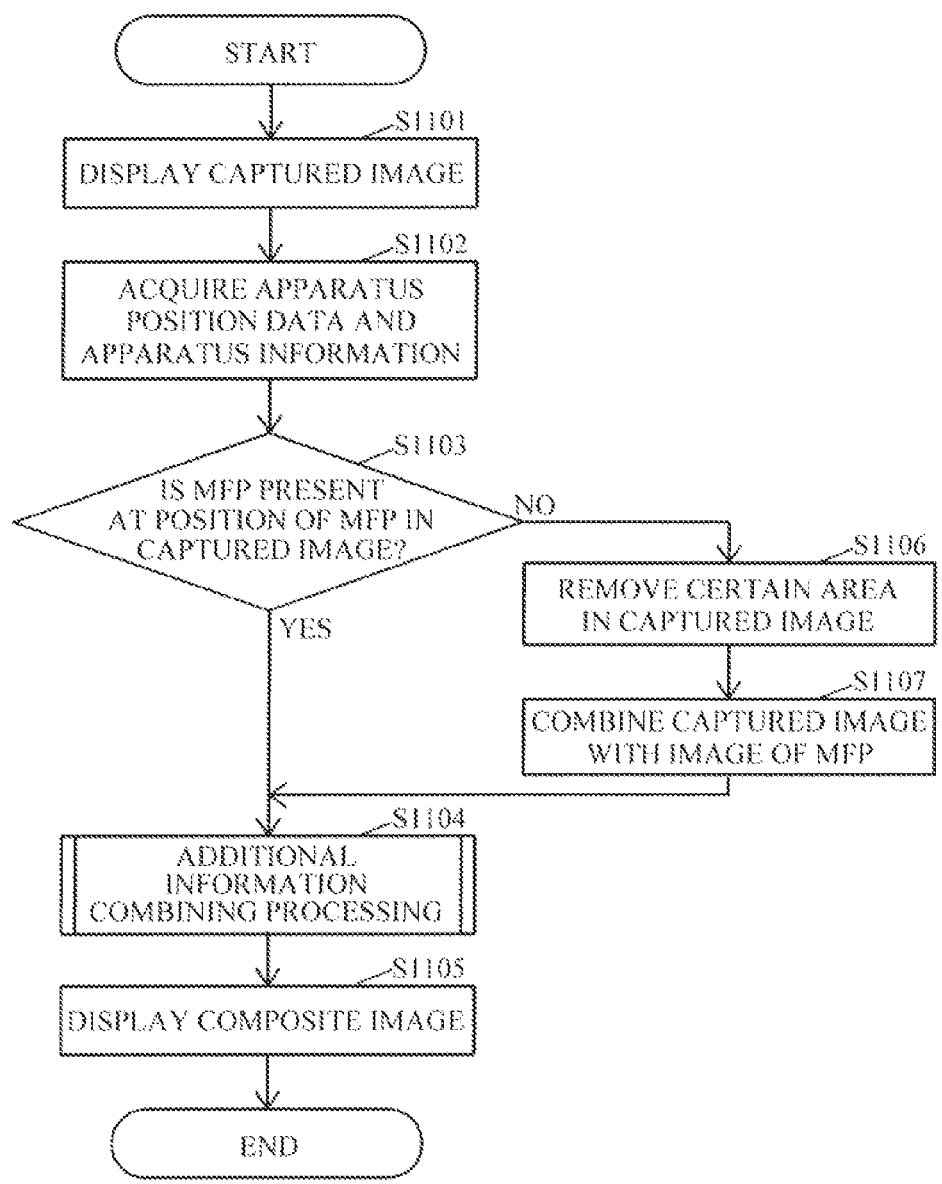
FIG. 18 illustrates a procedure performed by the portable apparatus illustrated in FIG. 17 for displaying a composite image.

FIG. 18 illustrates a procedure performed by the portable apparatus 140 for causing the display 142 to display a composite image formed of a captured image captured by the image capturing unit 143 and additional information based on apparatus information on an MFP.

As illustrated in FIG. 18, the display control unit 148d of the controller 148 in the portable apparatus 140 causes the display 142 to display a captured image captured by the image capturing unit 143 (S1101).

Next, the apparatus position acquisition unit 148a, apparatus information acquisition unit 148b, and apparatus image acquisition unit 148c of the controller 148 transmit, to the management server 130 via the network communication unit 146, information about the current position of the portable apparatus 140 in real space which has been detected by the position detection unit 144 and the current direction in which the portable apparatus 140 is oriented in real space, which has been detected by the direction detection unit 145. As a result, the apparatus position acquisition unit 148a, apparatus information acquisition unit 148b, and apparatus image acquisition unit 148c acquire, from the management server 130 via the network communication unit 146, apparatus position data, apparatus information, and apparatus image data of any MFP that is present in the range of the angle of image capturing performed by the image capturing unit 143 and in an area at a certain distance from the portable apparatus 140 (S1102).

Next, the presence determination unit 148e of the controller 148 determines whether or not an MFP is present at the position of the MFP in the captured image, the position corresponding to the relationship between the position of the MFP in real space which has been acquired in S1102 and the position of the portable apparatus 140 in real space which has been detected by the position detection unit 144, by performing image processing (S1103). In other words, the presence determination unit 148e determines whether or not an image of the MFP is present at the position of the MFP in the captured image.

If it is determined in S1103 that the MFP is present, the display control unit 148d of the controller 148 generates a composite image formed by combining additional information based on the apparatus information on the MFP which has been acquired in S1102 with the captured image captured by the image capturing unit 143, while linking the additional information to the position of the MFP in the captured image of the MFP (S1104). That is, the display control unit 148d performs additional information combining processing, which will be described below.

Then, the display control unit 148d causes the display 142 to display the composite image that has been generated in S1104 (S1105), and the operations illustrated in FIG. 18 end.

If it is determined in S1103 that the MFP is not present, the display control unit 148d cuts out and removes, from the captured image captured by the image capturing unit 143, a portion of the captured image at the position of the MFP (S1106).

Note that, in the situation where the display control unit 148*d* removes a portion of the captured image at the position of the MFP in S1106, the display control unit 148*d* determines the size of the area based on the distance between the position of the MFP in real space which has been acquired in S1102 and the position of the portable apparatus 140 in real space which has been detected by the position detection unit 144.

After the processing in S1106, the display control unit 148*d* generates a composite image formed by combining the captured image, from which the portion of the captured image at the position of the MFP has been removed in S1106, with the image of the MFP that has been acquired in S1102 (S1107).

Note that when the display control unit 148*d* combines the image of the MFP with the captured image in S1107, the display control unit 148*d* determines the size of the image of the MFP based on the distance between the position of the MFP in real space which has been acquired in S1102 and the position of the portable apparatus 140 in real space which has been detected by the position detection unit 144.

After the processing in S1107, the display control unit 148*d* generates a composite image formed by combining additional information based on apparatus information that has been acquired in S1102, the apparatus information corresponding to the MFP the image of which has been combined with the captured image in S1107, with the composite image that has been generated in S1107, while linking the additional information to the position of the MFP in the captured image (S1104). That is, the display control unit 148*d* performs additional information combining processing, which will be described below.

Then, the display control unit 148*d* causes the display 142 to display the composite image that has been generated in S1104 (S1105), and the operations illustrated in FIG. 18 end.

Figure 19:
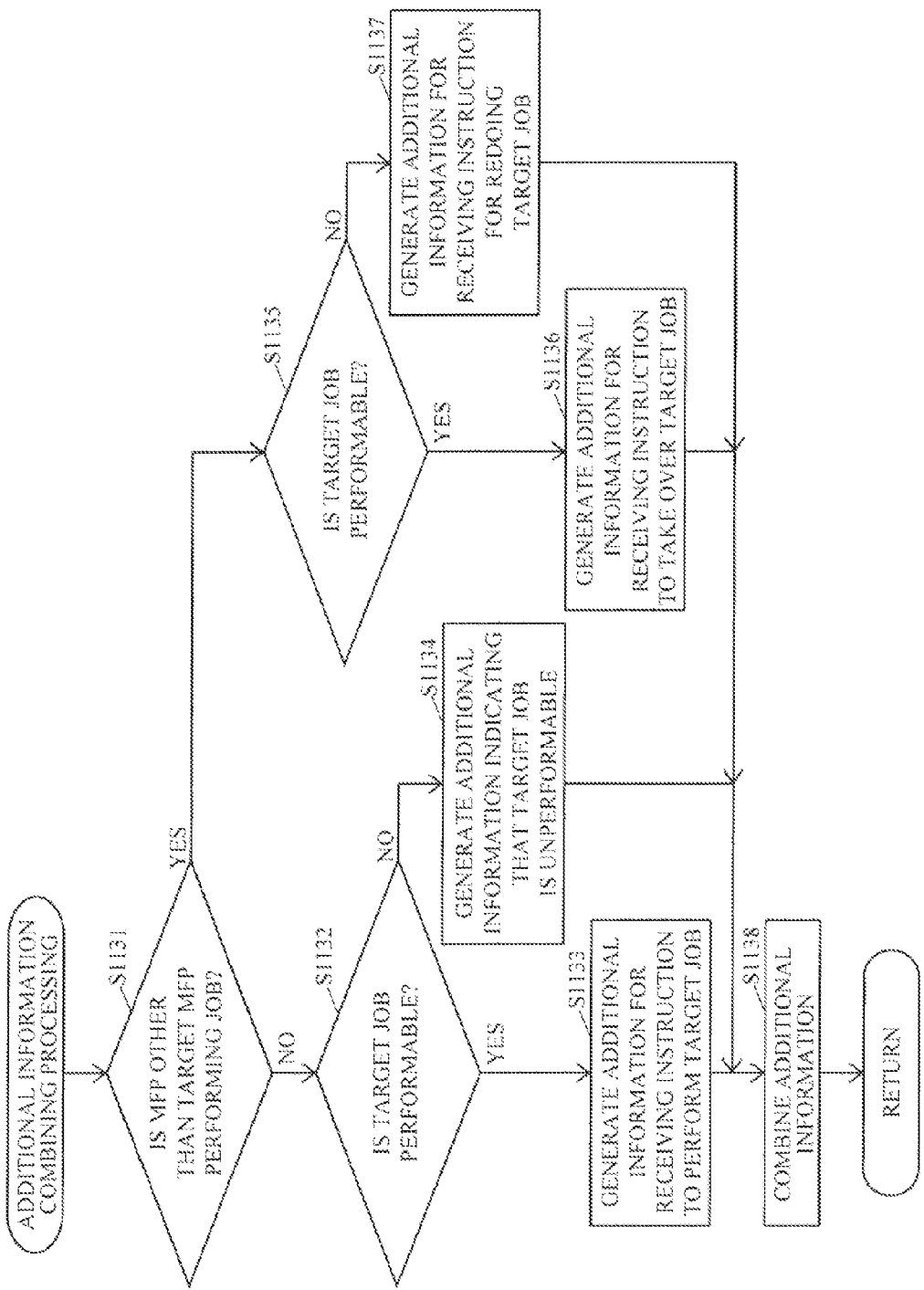
FIG. 19 illustrates a procedure of additional information combining processing in FIG. 18.

FIG. 19 illustrates a procedure of the additional information combining processing in FIG. 18.

As illustrated in FIG. 19, the display control unit 148*d* determines whether or not an MFP other than the target MFP has a job for which printing is ongoing (S1131). Here, if the display control unit 148*d* has not yet received, after transmitting an order to perform a job to an MFP other than the target MFP, a notification of end of printing from the MFP, the display control unit 148*d* determines that the MFP other than the target MFP has a job for which printing is ongoing.

If it is determined in S1131 that an MFP other than the target MFP does not have a job for which printing is ongoing, the printing ability determination unit 148*f* of the controller 148 determines, based on the apparatus information on the target MFP which has been acquired by the apparatus information acquisition unit 148*b*, whether or not the target MFP is able to perform a target job (S1132). For example, the printing ability determination unit 148*f* determines, based on the apparatus information on the target MFP, that the target MFP is unable to perform a target job, if the target MFP is performing printing. When the printing ability determination unit 148*f* determines, based on the apparatus information on the target MFP, that the target MFP is unable to perform color printing, and if a target job is a job of color printing, the printing ability determination unit 148*f* determines that the target MFP is unable to perform the target job. When the printing ability determination unit 148*f* acquires, based on the apparatus information on the target MFP, information about the paper sizes for which the target MFP is able to perform printing, and if the paper size specified for a target job is not included in the paper sizes information about which has been acquired, the printing ability determination unit 148*f* determines that the target MFP is unable to perform the target job.

If it is determined in S1132 that the target MFP is able to perform a target job, the display control unit 148*d* generates additional information used to receive an instruction for performing the target job by the target MFP (S1133).

On the other hand, if it is determined in S1132 that the target MFP is unable to perform a target job, the display control unit 148*d* generates additional information indicating that the target job by the target MFP is able to perform (S1134).

If it is determined in S1131 that an MFP other than the target MFP has a job for which printing is ongoing, the printing ability determination unit 148*f* of the controller 148 determines, based on the apparatus information on the target MFP which has been acquired by the apparatus information acquisition unit 148*b*, whether or not the target MFP is able to perform a target job, that is, the job for which printing is ongoing in the MFP other than the target MFP (S1135). For example, the printing ability determination unit 148*f* determines, based on the apparatus information on the target MFP, that, if the target MFP is an MFP that does not have a function of taking over a job for which an MFP other than the target MFP has performed printing halfway, the target MFP is unable to perform the target job. The printing ability determination unit 148*f* determines, based on the apparatus information on the target MFP, that, if the target MFP is performing printing, the target MFP is unable to perform a target job. When the printing ability determination unit 148*f* determines, based on the apparatus information on the target MFP, that the target MFP is unable to perform color printing, and if a target job is a job of color printing, the printing ability determination unit 148*f* determines that the target MFP is unable to perform the target job. The printing ability determination unit 148*f* acquires, based on the apparatus information on the target MFP, information about the paper sizes for which the target MFP is able to perform printing. If the paper size specified for the target job is not included in the paper sizes information about which has been acquired, the printing ability determination unit 148*f* determines that the target MFP is unable to perform the target job.

If it is determined in S1135 that the target MFP is able to perform a target job, the display control unit 148*d* generates additional information used to receive an instruction for taking over the target job by the target MFP (S1136).

On the other hand, if it is determined in S1135 that the target MFP is unable to perform a target job, the display control unit 148*d* generates additional information used to receive an instruction for redoing the target job by the target MFP (S1137).

After the processing in S1133, S1134, S1136, or S1137, the display control unit 148*d* generates a composite image formed by combining the additional information that has been generated in S1133, S1134, S1136, or S1137 with the captured image captured by the image capturing unit 143 (or, if a composite image has been generated in S1107, the generated composite image) (S1138), and the operations illustrated in FIG. 19 end.

Next, operations of the portable apparatus 140 to be performed in the situation of controlling an MFP based on a composite image displayed on the display 142 will be described.

Figure 20:
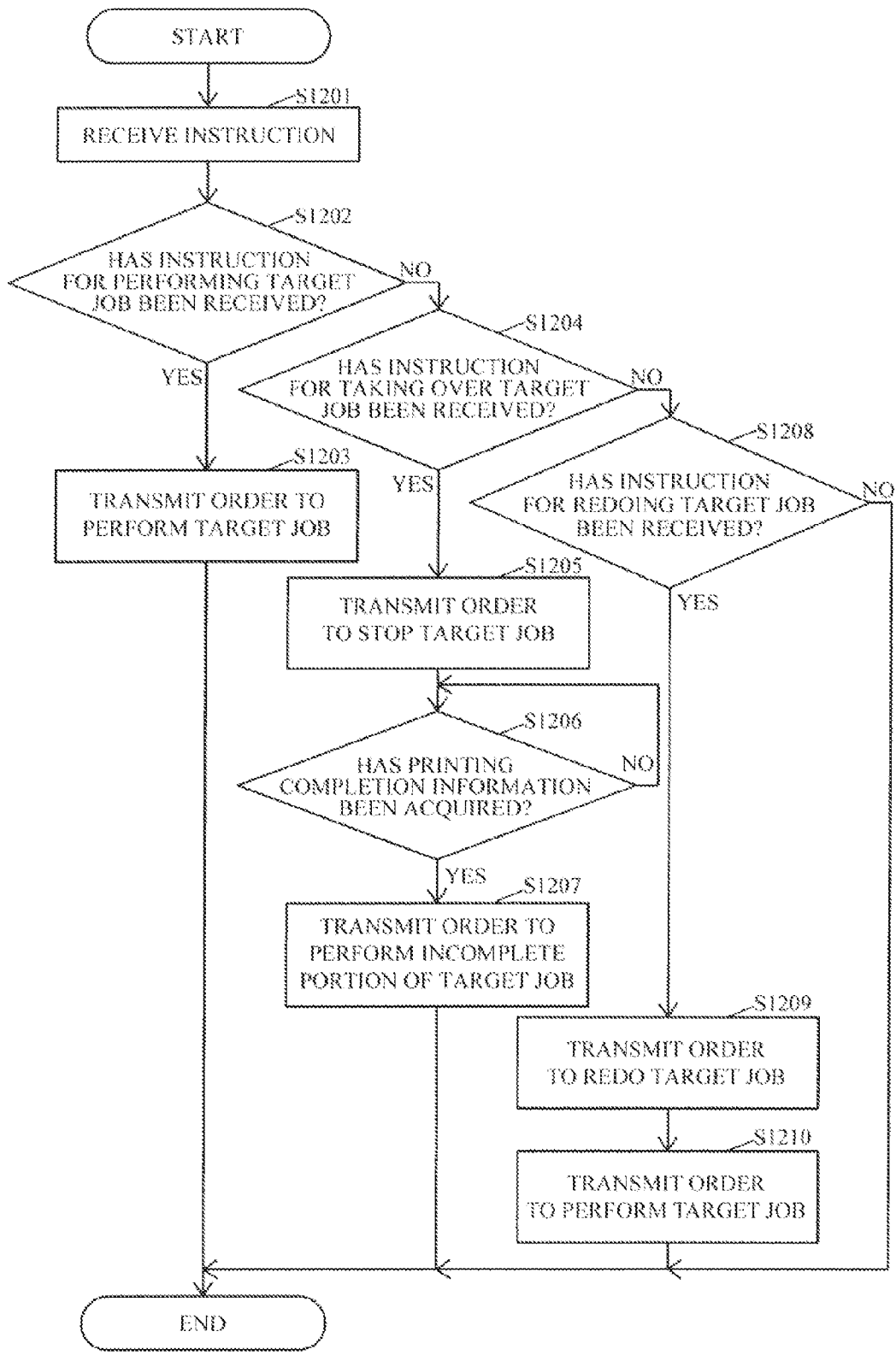
FIG. 20 illustrates a procedure performed by the portable apparatus illustrated in FIG. 17 for controlling an MFP.

FIG. 20 illustrates a procedure performed by the portable apparatus 140 for controlling an MFP based on a composite image displayed on the display 142.

As illustrated in FIG. 20, the instruction receiving unit 148g of the controller 148 in the portable apparatus 140 receives, from the operation unit 141, an instruction on additional information 150 in a composite image displayed by the display 142 in S1105 (S1201).

The order transmission unit 148h of the controller 148 determines whether or not an instruction for performing a target job by a target MFP has been received in S1201 (S1202).

If it is determined in S1202 that an instruction for performing a target job by a target MFP has been received, the order transmission unit 148h transmits, to the management server 130 via the network communication unit 146, an order for the target MFP to perform the target job (S1203). In response to this, the controller 135 of the management server 130 controls the target MFP, based on the order that has been received from the portable apparatus 140 via the network communication unit 133, so that the target MFP performs the target job. The controller of the target MFP performs, based on control performed by the management server 130, the target job using a printer.

If it is determined in S1202 that an instruction for performing a target job by the target MFP has not been received, the order transmission unit 148h determines whether or not an instruction for taking over the target job by the target MFP has been received in S1201 (S1204).

If it is determined in S1204 that an instruction for taking over the target job by the target MFP has been received, the order transmission unit 148h transmits, to the management server 130 via the network communication unit 146, an order for an MFP that is performing the target job (hereinafter referred to as a "printing MFP"), which is an order to stop the target job (S1205). In response to this, the controller 135 of the management server 130 controls the printing MFP, based on the order that has been received from the portable apparatus 140 via the network communication unit 133, so that the printing MFP stops the target job. When the controller of the printing MFP stops the target job using a printer based on control performed by the management server 130, the controller of the printing MFP transmits, to the management server 130, printing completion information that indicates a portion of the target job for which printing has been completed, as apparatus information on the printing MFP. When the controller 135 of the management server 130 receives, via the network communication unit 133, the printing completion information that has been transmitted by the printing MFP, the controller 135 of the management server 130 transmits, to the portable apparatus 140 via the network communication unit 133, the printing completion information that has been received as apparatus information on the printing MFP.

After the processing in S1205, the order transmission unit 148h repeatedly determines whether or not the printing completion information has been acquired by the apparatus information acquisition unit 148b as apparatus information on the printing MFP until it is determined that the printing completion information has been acquired by the apparatus information acquisition unit 148b as apparatus information on the printing MFP (S1206).

If the order transmission unit 148h determines in S1206 that the printing completion information has been acquired by the apparatus information acquisition unit 148b as apparatus information on the printing MFP, the order transmission unit 148h generates, based on the printing completion information, an order for the target MFP to perform a portion of the target job for which printing has not been completed, and transmits the order to the management server 130 via the network communication unit 146 (S1207). In response to this, the controller 135 of the management server 130 controls the target MFP, based on the order that has been received from the portable apparatus 140 via the network communication unit 133, so that the target MFP performs the portion of the target job for which printing has not been completed. The controller of the target MFP performs, based on control performed by the management server 130, the portion of the target job for which printing has not been completed, using a printer.

If it is determined in S1204 that an instruction for taking over the target job by the target MFP has not been received, the order transmission unit 148h determines whether or not an instruction for redoing the target job by the target MFP has been received in S1201 (S1208).

If the order transmission unit 148h determines in S1208 that an instruction for redoing the target job by the target MFP has been received, the order transmission unit 148h transmits, to the management server 130 via the network communication unit 146, an order for the printing MFP to stop the target job (S1209). In response to this, the controller 135 of the management server 130 controls the printing MFP, based on the order that has been received from the portable apparatus 140 via the network communication unit 133, so that the printing MFP stops the target job. The controller of the printing MFP stops, based on control performed by the management server 130, the target job using a printer.

After the processing in S1209, the order transmission unit 148h transmits, to the management server 130 via the network communication unit 146, an order for the target MFP to perform the target job (S1210). In response to this, the controller 135 of the management server 130 controls the target MFP, based on the order that has been received from the portable apparatus 140 via the network communication unit 133, so that the target MFP performs the target job. The controller of the target MFP performs, based on control performed by the management server 130, the target job using a printer.

Note that, if it is determined in S1135 that the target MFP is unable to perform the target job because of a difference between the ability of the target MFP and the details of printing corresponding to the target job, such as a difference between monochrome printing and color printing or a difference in paper size, the order transmission unit 148h modifies, when transmitting an order in S1210, the details of printing corresponding to the target job based on the ability of the target MFP. For example, when the target MFP is unable to perform color printing and if the target job is a job of color printing, the order transmission unit 148h modifies the details of printing corresponding to the target job so as to change color printing to monochrome printing based on the ability of the target MFP. In the situation where the paper size for which the target MFP is able to perform printing is an A4 size, not an A3 size, and if the paper size specified for the target job is the A3 size, the order transmission unit 148h modifies the paper size among the details of printing corresponding to the target job from the A3 size to the A4 size based on the ability of the target MFP.

S1209 and S1210 may be performed in reverse order or may be performed simultaneously.

After the processing in S1203, S1207, or S1210, or if the order transmission unit 148h determines in S1208 that an instruction for redoing the target job by the target MFP has not been received, the operations illustrated in FIG. 20 end.

An example will be described below in which a user is present on the third floor of the building 190 while carrying the portable apparatus 140 in a state where the MFPs 120A and 120B are present on the third and fourth floors of the building 190 respectively, as illustrated in FIG. 15.

Figure 21A:
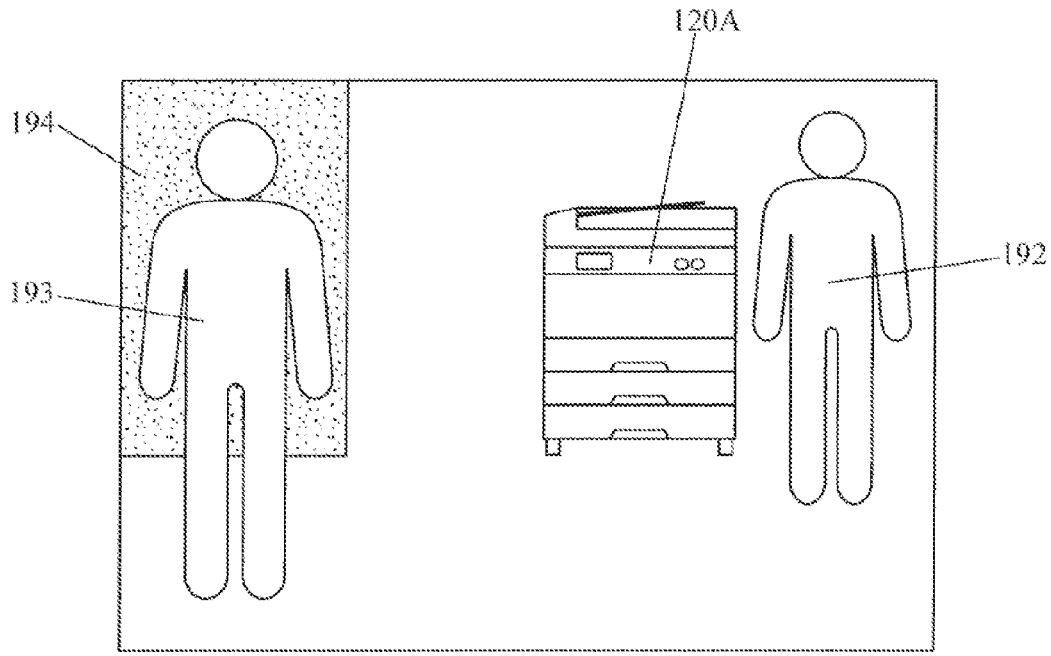
FIG. 21A illustrates an example of a captured image captured in a direction toward an MFP that is present on the same floor in a building.
Figure 21B:
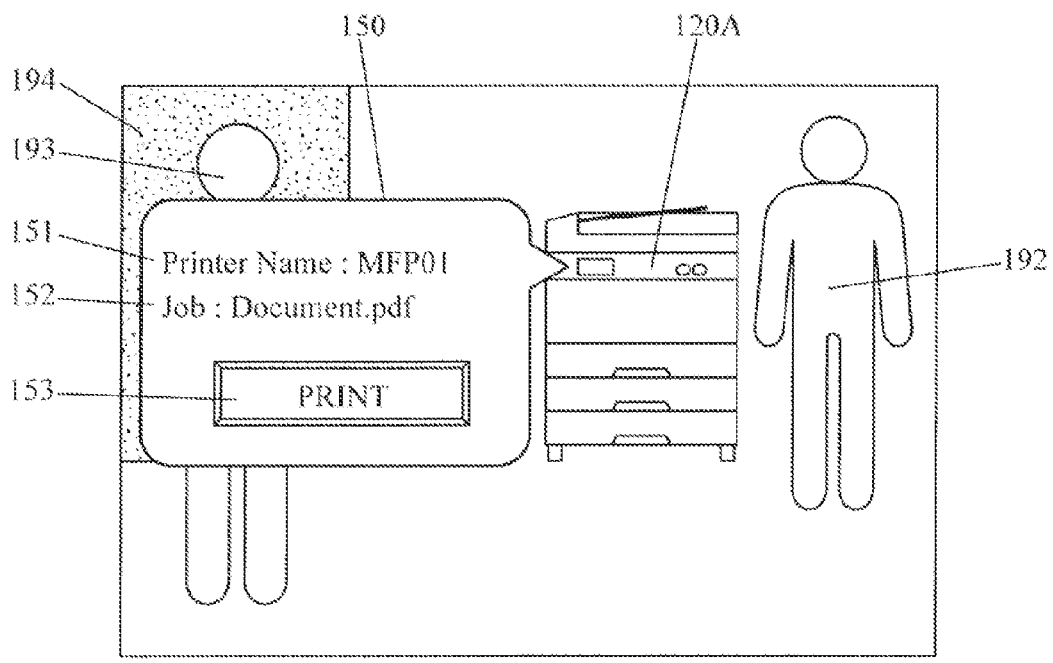
FIG. 21B illustrates an example of a composite image formed of the captured image and additional information on the MFP.

FIG. 21A illustrates an example of a captured image captured by the image capturing unit 143 of the portable apparatus 140 in a direction toward the MFP 120A that is present on the same floor in the building 190. FIG. 21B illustrates an example of a composite image formed by combining the additional information 150 based on apparatus information on the MFP 120A with the captured image in FIG. 21A.

When a user captures an image in a direction toward the MFP 120A that is present on the same floor in the building 190 by using the portable apparatus 140, a captured image displayed on the display 142 in S1101 is as illustrated in FIG. 21A, for example.

The captured image illustrated in FIG. 21A includes persons 192 and 193, a wall 194, and the like in addition to the MFP 120A.

Since there is no obstacle between the MFP 120A and the portable apparatus 140, the controller 148 of the portable apparatus 140 determines in S1103 that the MFP 120A is present at a position of the MFP 120A in the captured image. The controller 148 displays, on the display 142, a composite image as illustrated in FIG. 21B formed by combining the additional information 150 based on the apparatus information on the MFP 120A which has been acquired in S1102 with the captured image captured by the image capturing unit 143, while linking the additional information 150 to the position of the MFP 120A in the captured image (S1104 and S1105).

Here, if it is determined in S1131 that an MFP other than the target MFP 120A does not have a job for which printing is ongoing and if it is determined in S1132 that the MFP 120A is able to perform a target job, the additional information 150 illustrated in FIG. 21B includes, for example, a text 151 that indicates the name of the MFP 120A, which is the target MFP, a text 152 that indicates the target job, and a button 153 used to receive an instruction for performing the target job by the MFP 120A (S1133). Note that a target job is able to be specified via the operation unit 141.

Accordingly, a user is able to cause the MFP 120A to perform the target job by pressing the button 153 via the operation unit 141 (S1203).

Figure 22A:
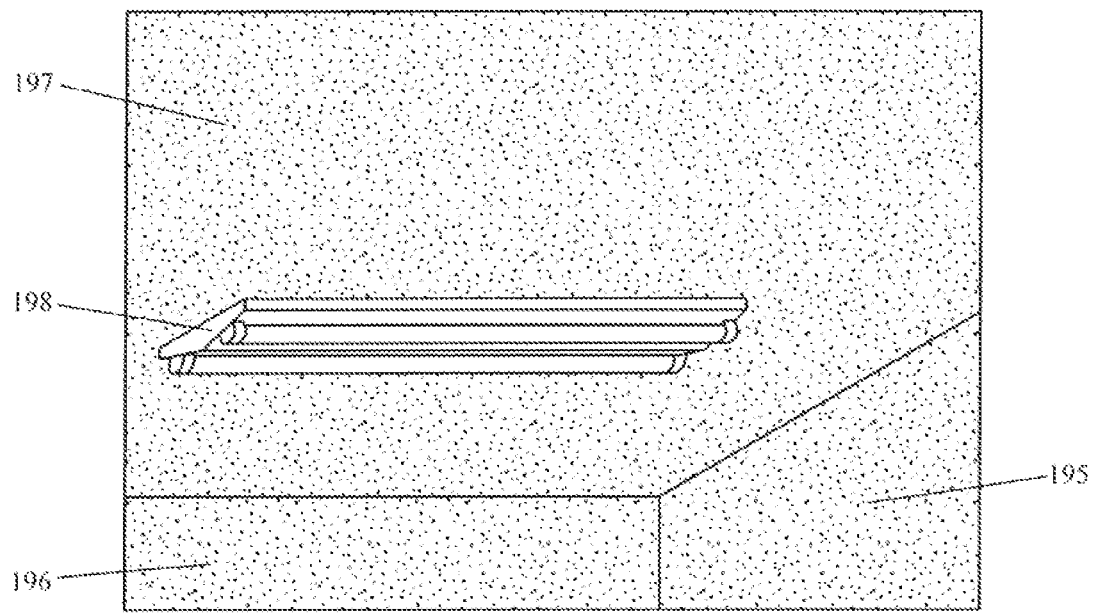
FIG. 22A illustrates an example of a captured image captured in a direction toward an MFP that is present on an upper floor in a building.
Figure 22B:
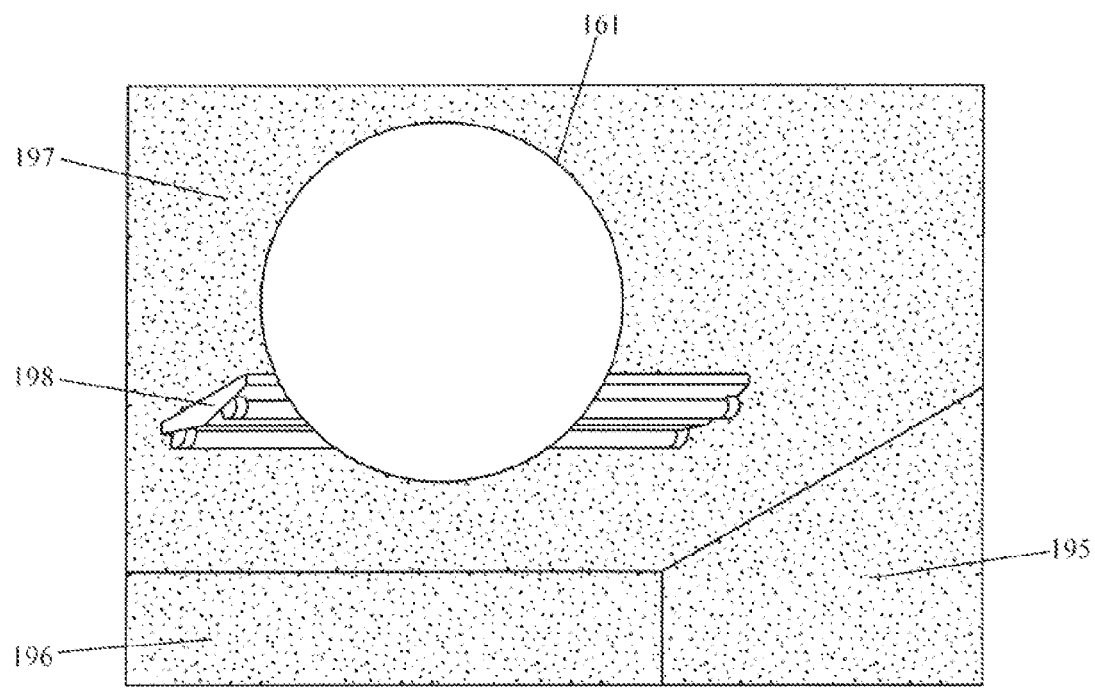
FIG. 22B illustrates an example of the captured image from which a portion has been removed.
Figure 23A:
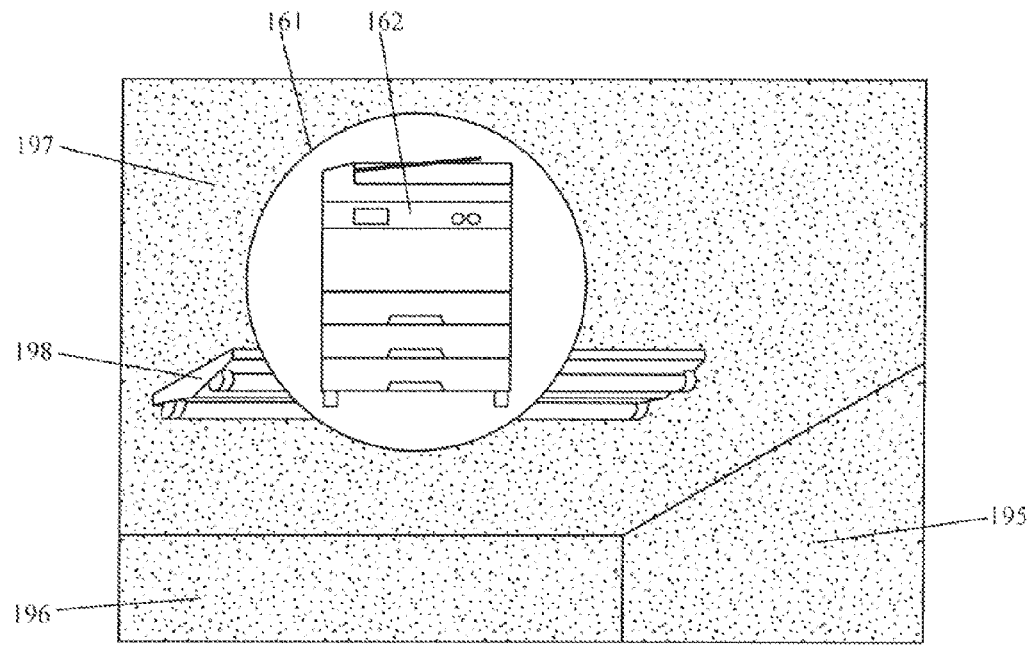
FIG. 23A illustrates an example of a composite image formed of a captured image and an image of an MFP.
Figure 23B:
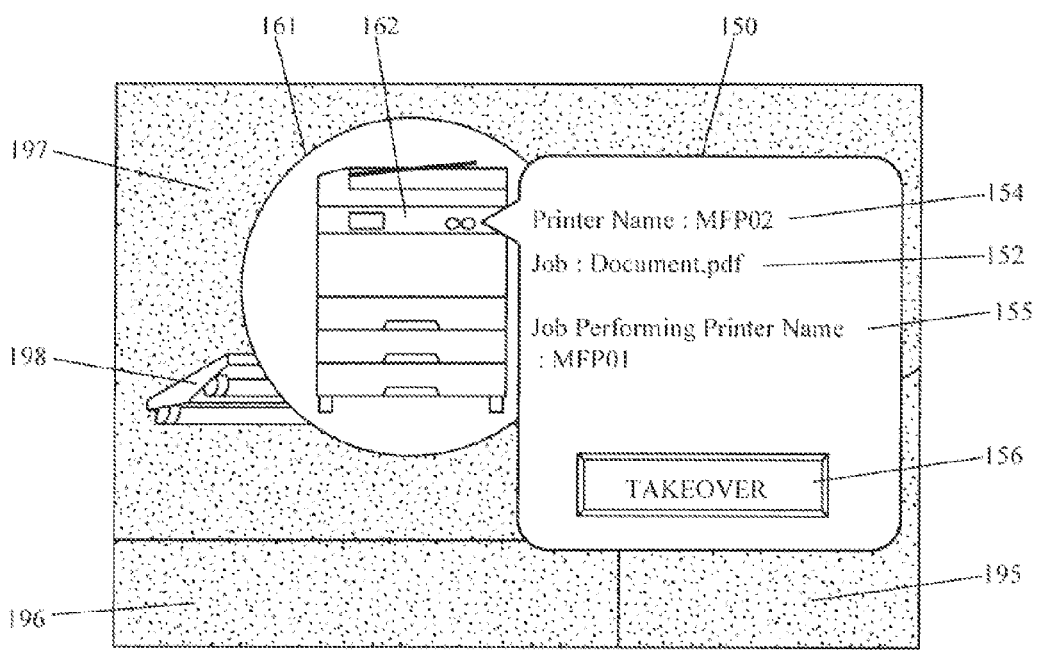
FIG. 23B illustrates an example of a composite image formed of that composite image and additional information on the MFP.

FIG. 22A illustrates an example of a captured image captured by the image capturing unit 143 of the portable apparatus 140 in a direction toward the MFP 120B that is present on an upper floor in the building 190. FIG. 22B illustrates an example of the captured image in FIG. 22A from which a portion has been removed. FIG. 23A illustrates an example of a composite image formed of the captured image in FIG. 22B and an image of the MFP 120B. FIG. 23B illustrates an example of a composite image formed of the composite image in FIG. 23A and the additional information 150 based on apparatus information on the MFP 120B.

When a user captures an image in a direction toward the MFP 120B that is present on an upper floor in the building 190 by using the portable apparatus 140 after a user has made, via the portable apparatus 140, the MFP 120A perform a target job, a captured image displayed on the display 142 in S1101 is as illustrated in FIG. 22A, for example.

The captured image illustrated in FIG. 22A includes walls 195 and 196, a ceiling 197, a lighting fixture 198, and the like.

Since there are obstacles, such as the ceiling 197 and the lighting fixture 198, between the MFP 120B and the portable apparatus 140, the controller 148 of the portable apparatus 140 determines in S1103 that the MFP 120B is not present at the position of the MFP 120B in the captured image. The controller 148 cuts out and removes, from the captured image captured by the image capturing unit 143, a portion 161 in the captured image at the position of the MFP 120B (S1106). Next, the controller 148 generates a composite image as illustrated in FIG. 23A formed by combining an image 162, which is an image of the MFP 120B that has been acquired in S1102 with the captured image from which the portion 161 has been removed, at the position of the MFP 120B (S1107). Lastly, the controller 148 of the portable apparatus 140 displays, on the display 142, a composite image as illustrated in FIG. 23B formed by combining the additional information 150 based on the apparatus information on the MFP 120B which has been acquired in S1102 with the composite image that has been generated in S1107, while linking the additional information 150 to the position of the MFP 120B in the captured image (S1104 and S1105).

Here, it is determined in S1131 that the MFP 120A, which is not the target MFP 120B, has a job for which printing is ongoing. If it is determined in S1135 that the MFP 120B is able to perform a target job, that is, the job for which printing is ongoing in the MFP 120A, the additional information 150 illustrated in FIG. 23B includes, for example, a text 154 that indicates the name of the target MFP 120B, the text 152 that indicates the target job, a text 155 that indicates the name of the MFP 120A, which is printing the target job, and a button 156 used to receive an instruction for taking over the target job by the MFP 120B (S1136).

Accordingly, a user is able to cause the MFP 120A to stop the target job and cause the MFP 120B to take over the target job by pressing the button 156 via the operation unit 141 (S1205 to S1207).

For example, a user makes, via the portable apparatus 140, the MFP 120A installed on the third floor start a job related to material for a meeting, when the user is present on the third floor. When the user determines thereafter that printing will not be ready for the meeting to be held at a meeting place located on the fourth floor if the user waits for completion of printing by the MFP 120A, the user causes the MFP 120A to stop the job and causes the MFP 120B installed near the meeting place on the fourth floor to take over the job, by pressing the button 156 via the operation unit 141. The user picks up a printout on which the job has been printed up to the middle of the job by the MFP 120A and moves from the third floor to the fourth floor. In this situation, in the MFP 120B, performing a portion of the job for which printing has not been completed is in progress while the user is moving. Lastly, the user picks up a printout on which the job has been printed from the middle of the job and is able to bring the printout that has been printed by the MFP 120A and the printout that has been printed by the MFP 120B together to the meeting held in the meeting place on the fourth floor.

Figure 24:
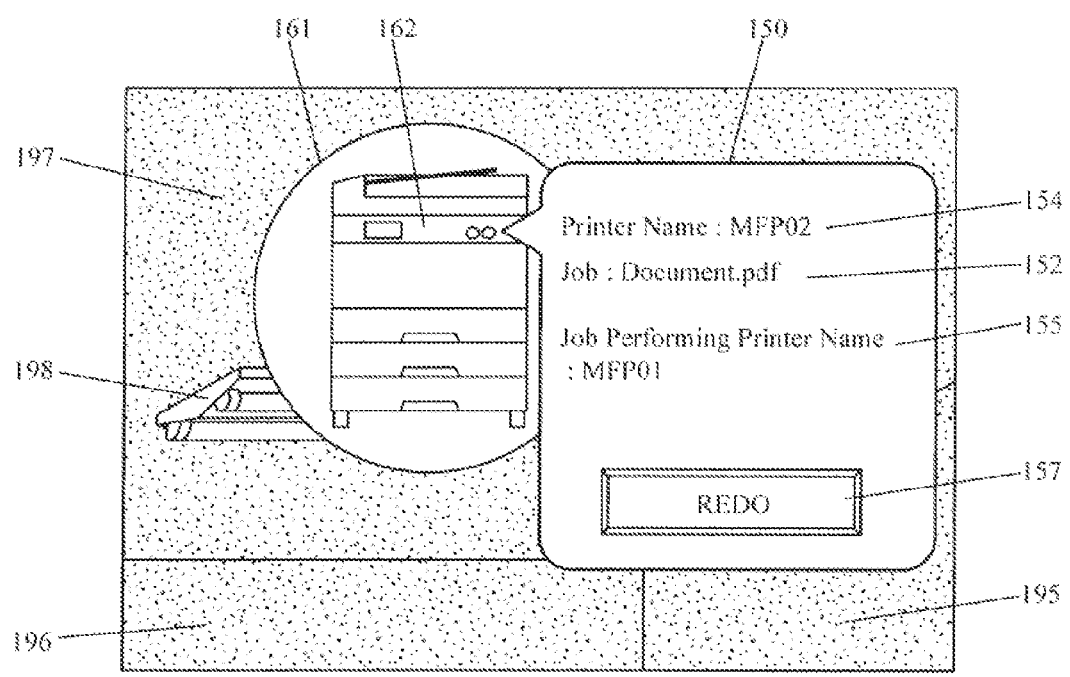
FIG. 24 illustrates an example of a composite image formed of a composite image and additional information on an MFP.

Note that, if it is determined in S1131 that the MFP 120A, which is not the target MFP 120B, has a job for which printing is ongoing and if it is determined in S1135 that the MFP 120B is unable to perform a target job, that is, the job for which printing is ongoing in the MFP 120A, a composite image illustrated in FIG. 24 is displayed on the display 142, for example.

FIG. 24 illustrates an example of a composite image formed by combining the additional information 150 based on the apparatus information on the MFP 120B with the composite image in FIG. 23A.

The additional information 150 illustrated in FIG. 24 includes the text 154 that indicates the name of the target MFP 120B, the text 152 that indicates the target job, the text 155 that indicates the name of the MFP 120A that is printing the target job, and a button 157 used to receive an instruction for redoing the target job by the MFP 120B (S1137).

Accordingly, a user is able to cause the MFP 120A to stop the target job and cause the MFP 120B to redo the target job by pressing the button 156 via the operation unit 141 (S1209 and S1210).

Note that the additional information 150 illustrated in FIG. 23B or FIG. 24 may include a button used to receive an instruction for continuing, by the MFP 120A, a target job. However, the MFP 120A continues a target job unless otherwise instructed after starting the target job. Therefore, a user consequently instructs for continuing the target job by the MFP 120A.

As described above, if an instruction for taking over a target job by a second MFP is received (YES in S1204) after an order for a first MFP to perform the target job has been transmitted (S1203), the portable apparatus 140 will automatically perform transmission of an order for the first MFP to stop the job (S1205) and transmission of an order for the second MFP to perform a portion of the job for which printing has not been completed by the first MFP (S1207). Accordingly, in the situation of making the first MFP stop a target job and making the second MFP taking over the target job, operability may be improved with the portable apparatus 140.

After an order for the first MFP to perform a job has been transmitted (S1203), if the second MFP is unable to perform the job (YES in S1131 and NO in S1135), the portable apparatus 140 will not receive an instruction for taking over the job by the second MFP (NO in S1204). If the second MFP is able to perform a job (YES in S1131 and YES in S1135), the portable apparatus 140 will receive an instruction for taking over the job by the second MFP (S1136 and YES in S1204). Accordingly, useless operations to be performed by a user may be eliminated with the portable apparatus 140. Therefore, when making the first MFP stop a target job and making the second MFP taking over the target job, operability may be improved with the portable apparatus 140.

After an order for the first MFP to perform a job has been transmitted (S1203), if the second MFP is unable to perform the job (YES in S1131 and NO in S1135), the portable apparatus 140 will automatically perform transmission of an order for the first MFP to stop the job (S1209) and transmission of an order for the second MFP to perform printing of the job (S1210), when an instruction for redoing the job by the second MFP is received (S1137 and YES in S1208). Accordingly, when making the first MFP stop a target job and making the second MFP redo the target job, operability may be improved with the portable apparatus 140.

If a target MFP is not present in the captured image (NO in S1103), the portable apparatus 140 will combine both of the additional information 150 based on apparatus information on the target MFP and the image 162, which is an image of the target MFP, with the captured image (S1107 and S1104). If a target MFP is present in the captured image (YES in S1103), the portable apparatus 140 will combine only the additional information 150, among the additional information 150 based on apparatus information on the target MFP and an image of the target MFP, with the captured image (S1104). Accordingly, intuitive display of the additional information 150 based on apparatus information on the MFP may be improved with the portable apparatus 140.

More specifically, if there are the ceiling 197 and the lighting fixture 198, which are obstacles, between the MFP 120B and the portable apparatus 140, for example, in other words, if the MFP 120B is not present in the captured image as illustrated in FIG. 22A, the portable apparatus 140 will combine not only the additional information 150 based on the apparatus information on the MFP 120B but also the image 162, which is an image of the MFP 120B, with the captured image, as illustrated in FIG. 23B (S1107 and S1104). Accordingly, intuitive display of the additional information 150 based on the apparatus information on the MFP 120B may be improved with the portable apparatus 140.

Note that the image forming system 110 includes the management server 130 in this embodiment, however, an MFP itself may function as the management server 130. That is, the portable apparatus 140 may receive, directly from an MFP, apparatus position data, apparatus information, and apparatus image data of the MFP, and may transmit an order for an MFP directly to the MFP.

The image forming system 110 includes an MFP in this embodiment as an image forming apparatus of the present disclosure, however, the image forming system 110 may include an image forming apparatus other than an MFP, such as a printer, a copier, or a facsimile machine, as an image forming apparatus of the present disclosure. The image forming system 110 may include an electronic apparatus other than an image forming apparatus as an electronic apparatus of the present disclosure.

It should be understood that various changes and modifications to the presently embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A portable apparatus comprising:
an image capturing device;
a display device;
a memory that stores a program; and
a processor, wherein when the processor executes the program, the processor operates as:
an apparatus position acquisition unit that acquires a position of an electronic apparatus in real space;
an apparatus information acquisition unit that acquires apparatus information on the electronic apparatus;
a display control unit that causes the display device to display a composite image formed by combining additional information based on the apparatus information that has been acquired by the apparatus information acquisition unit with a captured image captured by the image capturing device, while linking the additional information to an apparatus position, which is a position of the electronic apparatus in the captured image, this position corresponding to a relationship between the position of the electronic apparatus in real space which has been acquired by the apparatus position acquisition unit and a position of the portable apparatus in real space;

an instruction receiving unit that receives an instruction on the additional information in the composite image;

an order transmission unit that transmits an order, for the electronic apparatus, based on the instruction that has been received by the instruction receiving unit;

an apparatus image acquisition unit that acquires an image of the electronic apparatus; and a presence determination unit that determines whether or not the electronic apparatus is present at the position of the electronic apparatus in the captured image by performing image processing, wherein the order transmission unit transmits an order ordering the first electronic apparatus to stop the job, in a situation where, after transmitting an order for a first electronic apparatus to perform a job, an instruction for taking over of processing of the job by a second electronic apparatus has been received by the instruction receiving unit, the order transmission unit transmits, based on the processing completion information, an order for the second electronic apparatus to perform a portion of the job for which processing has not been completed, in a situation where, after transmitting the order for the first electronic apparatus to stop the job, processing completion information, the processing completion information indicating a portion of the job for which processing has been completed, has been acquired by the apparatus information acquisition unit as the apparatus information on the first electronic apparatus, the display control unit generates the composite image formed by combining, at the position of the electronic apparatus in the captured image, the image of the electronic apparatus which has been acquired by the apparatus image acquisition unit with the captured image, in a situation where the electronic apparatus is determined, by the presence determination unit, to be not present, and the display control unit generates the composite image formed without combining, at the position of the electronic apparatus in the captured image, the image of the electronic apparatus which has been acquired by the apparatus image acquisition unit with the captured image, in a situation where the electronic apparatus is determined, by the presence determination unit, to be present.

2. The portable apparatus according to claim 1, wherein:

when the processor executes the program, the processor further operates as a performing ability determination unit that determines, based on the apparatus information on the electronic apparatus which has been acquired by the apparatus information acquisition unit, whether or not the electronic apparatus is able to perform the job;

the display control unit avoids generating the additional information used to receive an instruction for taking over the job by the second electronic apparatus, in a situation where, after an order for the first electronic apparatus to perform the job has been transmitted by the order transmission unit, the second electronic apparatus is determined, by the performing ability determination unit, to be unable to perform the job; and the display control unit generates the additional information used to receive an instruction for taking over the job by the second electronic apparatus, in a situation where, after the order for the first electronic apparatus to perform the job has been transmitted by the order transmission unit, the second electronic apparatus is determined, by the performing ability determination unit, to be able to perform the job.

3. The portable apparatus according to claim 2, wherein:

the display control unit generates the additional information used to receive an instruction for redoing the job by the second electronic apparatus, in a situation where, after the order for the first electronic apparatus to perform the job has been transmitted by the order transmission unit, the second electronic apparatus is determined, by the performing ability determination unit, to be unable to perform the job; and the order transmission unit transmits an order for the first electronic apparatus to stop the job and transmits an order for the second electronic apparatus to perform the job, in a situation where, after transmitting the order for the first electronic apparatus to perform the job, the instruction for redoing the job by the second electronic apparatus has been received by the instruction receiving unit.

4. The portable apparatus according to claim 1, wherein:

the electronic apparatus is an image forming apparatus; and the job is a print job.

5. The portable apparatus according to claim 1, wherein, when the display control unit combines the image of the electronic apparatus with the captured image, the display control unit determines a size of the image of the electronic apparatus based on the distance between the position of the electronic apparatus in real space and the position of the portable apparatus in real space.

6. The portable apparatus according to claim 1, wherein, in a situation where the electronic apparatus is determined, by the presence determination unit, to be not present, the display control unit cuts out and removes, from the captured image, a portion of the captured image at the position of the electronic apparatus, and generates the composite image formed by combining the captured image, from which the portion of the captured image at the position of the electronic apparatus has been removed, with the image of the electronic apparatus that has been acquired.

7. The portable apparatus according to claim 6, wherein, in the situation where the display control unit removes the portion of the captured image at the position of the electronic apparatus, the display control unit determines a size of the portion of the captured image to be cut out, based on a distance between the position of the electronic apparatus in real space and the position of the portable apparatus in real space, and wherein, when the display control unit combines the image of the electronic apparatus with the captured image, the display control unit determines a size of the image of the electronic apparatus based on the distance between the position of the electronic apparatus in real space and the position of the portable apparatus in real space.

* * * * *